(12) United States Patent
Asthana et al.

(10) Patent No.: US 12,052,658 B2
(45) Date of Patent: Jul. 30, 2024

(54) METHOD AND SYSTEMS FOR ENHANCING USER NETWORK SLICE EXPERIENCE

(71) Applicant: SAMSUNG ELECTRONICS CO., LTD., Suwon-si (KR)

(72) Inventors: Brijendra Kumar Asthana, Lucknow (IN); Subhrodip Mazumdar, Jharkhand (IN); Danish Ehsan Hashmi, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 418 days.

(21) Appl. No.: 17/511,043

(22) Filed: Oct. 26, 2021

(65) Prior Publication Data

US 2022/0124609 A1    Apr. 21, 2022

Related U.S. Application Data

(63) Continuation of application No. PCT/KR2021/014411, filed on Oct. 15, 2021.

(30) Foreign Application Priority Data

Oct. 16, 2020 (IN) .............................. 202041045181
Oct. 13, 2021 (IN) .............................. 202142046809

(51) Int. Cl.
*H04W 48/18* (2009.01)
*G06N 20/00* (2019.01)
(Continued)

(52) U.S. Cl.
CPC ............ *H04W 48/18* (2013.01); *G06N 20/00* (2019.01); *H04W 40/248* (2013.01); *H04W 84/042* (2013.01)

(58) Field of Classification Search
None
See application file for complete search history.

(56) References Cited

U.S. PATENT DOCUMENTS

| 2005/0094593 A1* | 5/2005 | Buckley | H04W 80/04 370/328 |
| 2014/0059218 A1* | 2/2014 | Ganu | H04B 17/318 709/224 |

(Continued)

FOREIGN PATENT DOCUMENTS

| CN | 111404814 A | 7/2020 |
| CN | 114079933 A | 2/2022 |

(Continued)

OTHER PUBLICATIONS

"3rd Generation Partnership Project; Technical Specification Group Core Network and Terminals; Non-Access-Stratum (NAS) functions related to Mobile Station (MS) in idle mode (Release 17)", 3GPP TS 23.122 V17.0.0, Technical Specification, 3GPP, Sep. 24, 2020, 83 pages total.

(Continued)

*Primary Examiner* — Angela Nguyen
(74) *Attorney, Agent, or Firm* — Sughrue Mion, PLLC

(57) ABSTRACT

A method for network slice enhancement for a user equipment (UE) includes receiving, at an application processor (AP) from a modem, a list of UE route selection policy (URSP) rules, one or more network slice selection assistance information (S-NSSAI) associated with one or more network slices categorized among configured network slices, rejected network slices, requested network slices, and allowed network slices, and protocol data unit (PDU) session information, and maintaining, by the AP, a database to store information received at the AP. The one or more network slices execute one or more services at the UE.

20 Claims, 19 Drawing Sheets

(51) Int. Cl.
*H04W 40/24* (2009.01)
*H04W 84/04* (2009.01)

(56) References Cited

U.S. PATENT DOCUMENTS

| | | | |
|---|---|---|---|
| 2019/0320314 A1 | 10/2019 | Yang | |
| 2020/0037387 A1 | 1/2020 | Lee et al. | |
| 2020/0053622 A1 | 2/2020 | Huang-Fu et al. | |
| 2020/0169921 A1 | 5/2020 | Zhu et al. | |
| 2020/0187085 A1 | 6/2020 | Jagannatha et al. | |
| 2022/0095159 A1* | 3/2022 | Patil | H04W 48/02 |

FOREIGN PATENT DOCUMENTS

| | | |
|---|---|---|
| KR | 10-2021-0136794 A | 11/2021 |
| WO | 2018/215076 A1 | 11/2018 |
| WO | 2019/024604 A1 | 2/2019 |

OTHER PUBLICATIONS

"3rd Generation Partnership Project; Technical Specification Group Core Network and Terminals; Non-Access-Stratum (NAS) protocol for 5G System (5GS); Stage 3; (Release 17)", 3GPP TS 24.501 V17.0.0, Technical Specification, 3GPP, Sep. 25, 2020, 36 pages total.
Communication dated Jan. 21, 2022, issued by the International Searching Authority in counterpart International Application No. PCT/KR2021/014411 (PCT/ISA/210 and PCT/ISA/237).
Communication issued May 30, 2022 by the Indian Patent Office in Indian Patent Application No. No. 202041045181.
Communication issued Dec. 13, 2023 by the Intellectual Property Office of India in Indian Patent Application No. 202142046809.
Communication issued Apr. 29, 2024 by the Indian Patent Office in Indian Patent Application No. 202041045181.

* cited by examiner

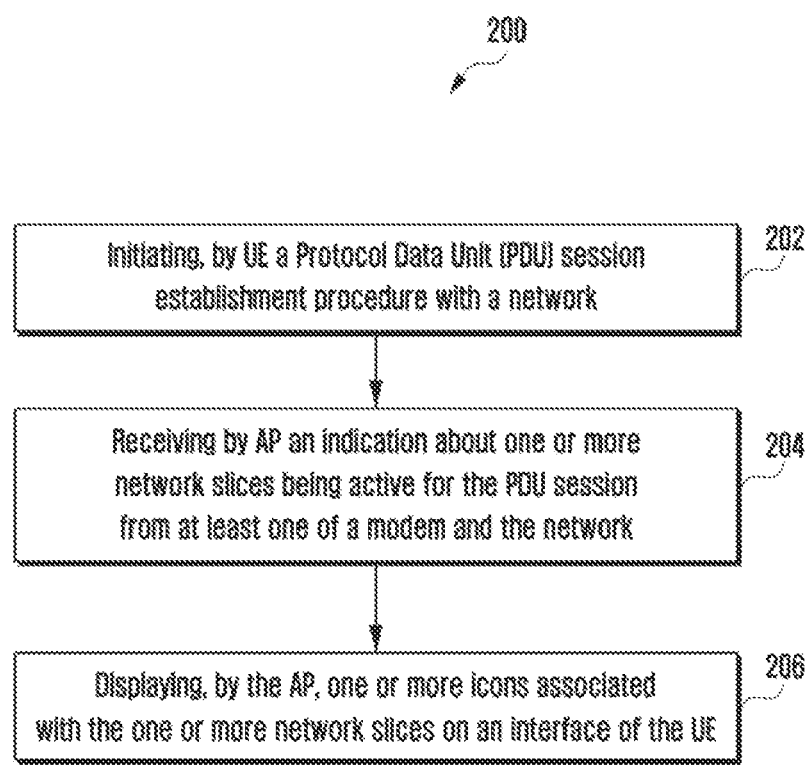

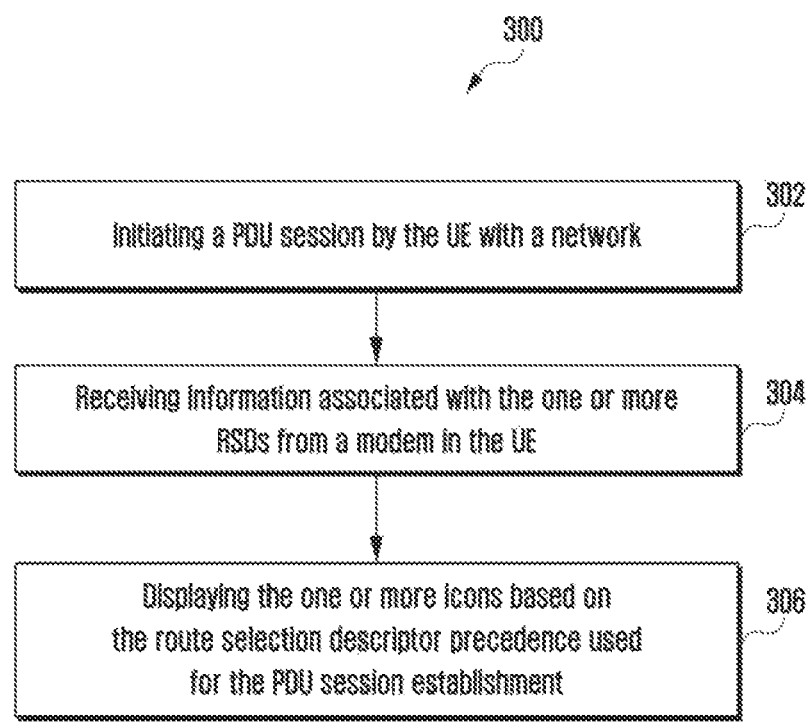

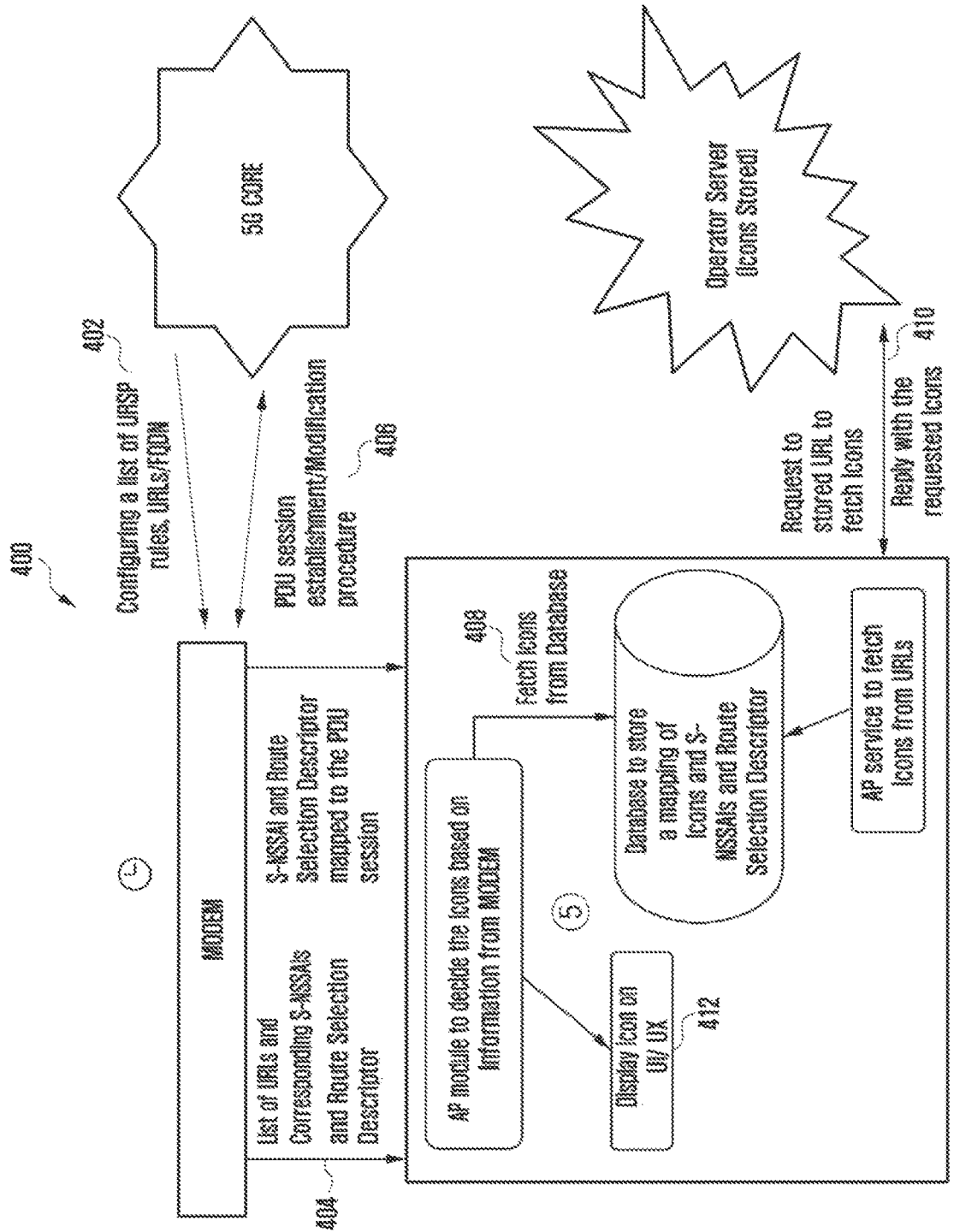

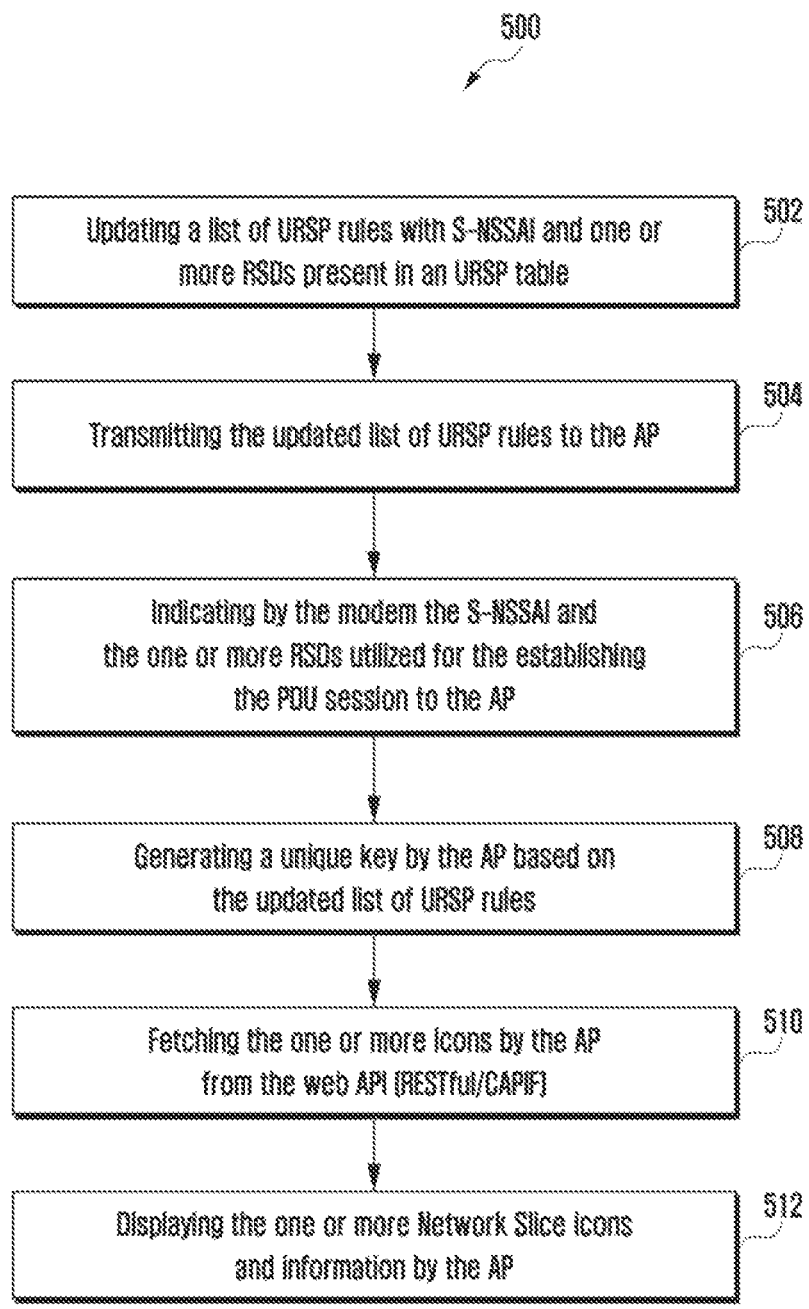

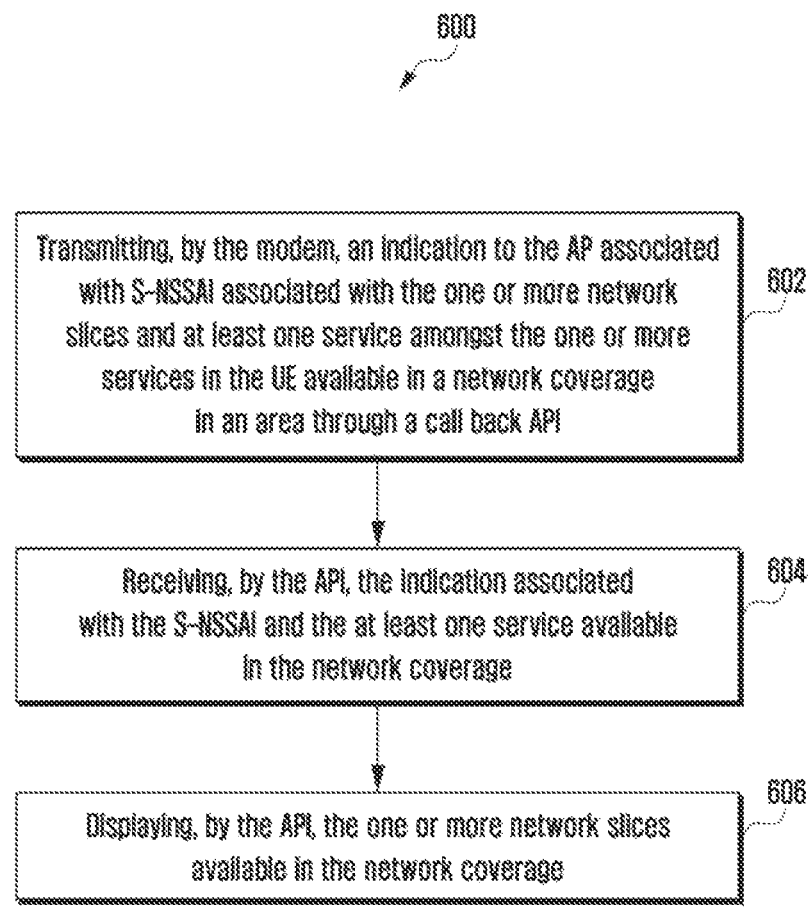

FIG. 7

| Traffic Flow Descriptor | Route Selection Descriptor | Example Icon |
|---|---|---|
| Rule Precedence =1<br>Traffic Descriptor:<br>Application Identifiers=com.netflix.android<br>Connection Capabilities= "internet" | Route Selection Descriptor Precedence =1<br>Network Slice Selection: S-NSSAI-video<br>DNN Selection: SpeedVideo<br>Access Type preference: Multi-Access |  |
| | Route Selection Descriptor Precedence =2<br>Network Slice Selection: S-NSSAI-video<br>DNN Selection: Video<br>Access Type preference: Multi-Access |  |
| | Route Selection Descriptor Precedence =3<br>Network Slice Selection: S-NSSAI-Default<br>DNN Selection: SpeedVideo<br>Access Type preference: Multi-Access | 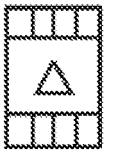 |
| Rule Precedence = 10<br>West priority<br>Traffic Descriptor: * | Route Selection Descriptor Precedence =1<br>Network Slice Selection: S-NSSAI-Default<br>SSC Mode Selection: SSC Mode 3<br>DNN Selection: Internet | Show Normal 5G Icon Only |

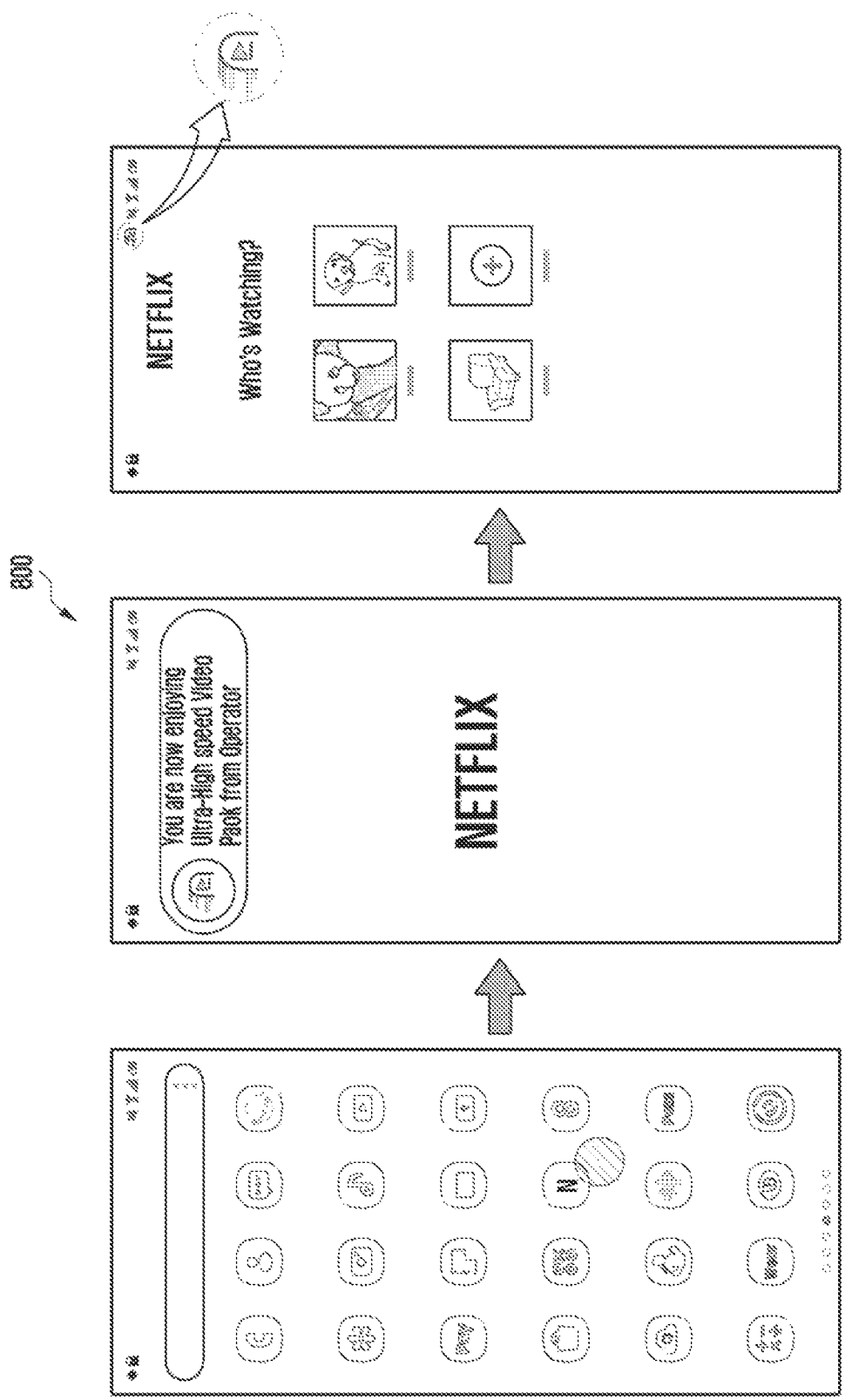

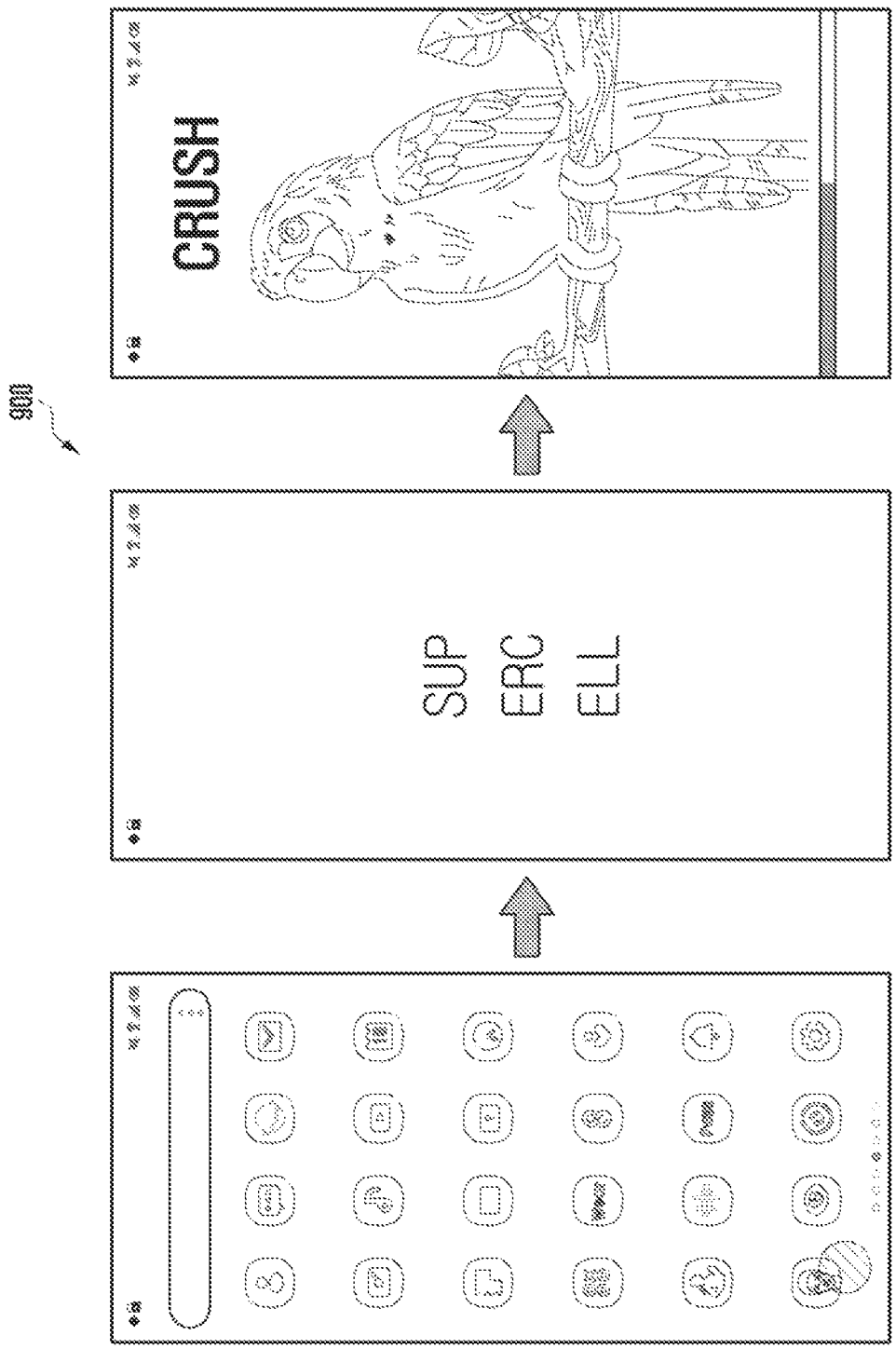

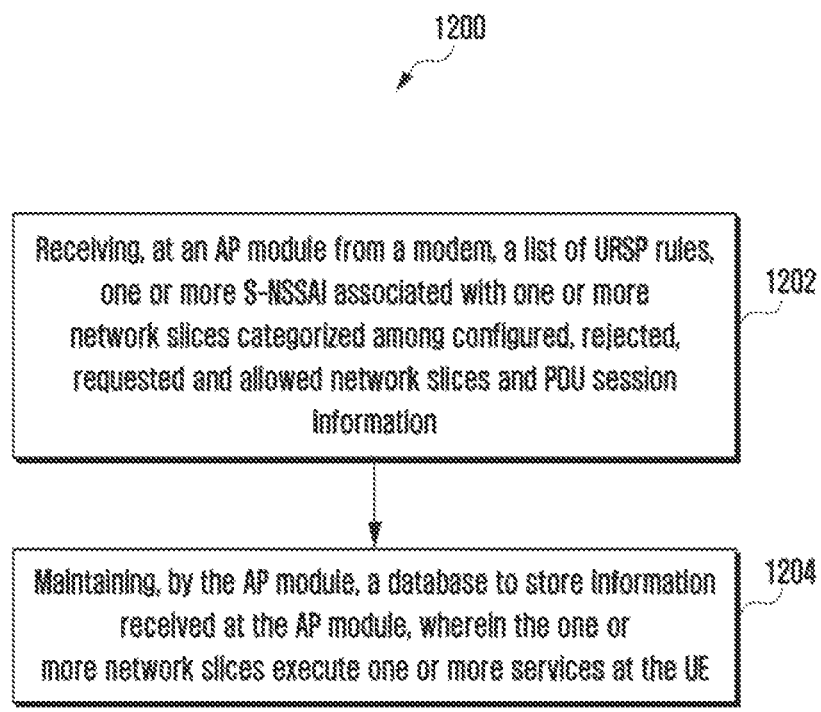

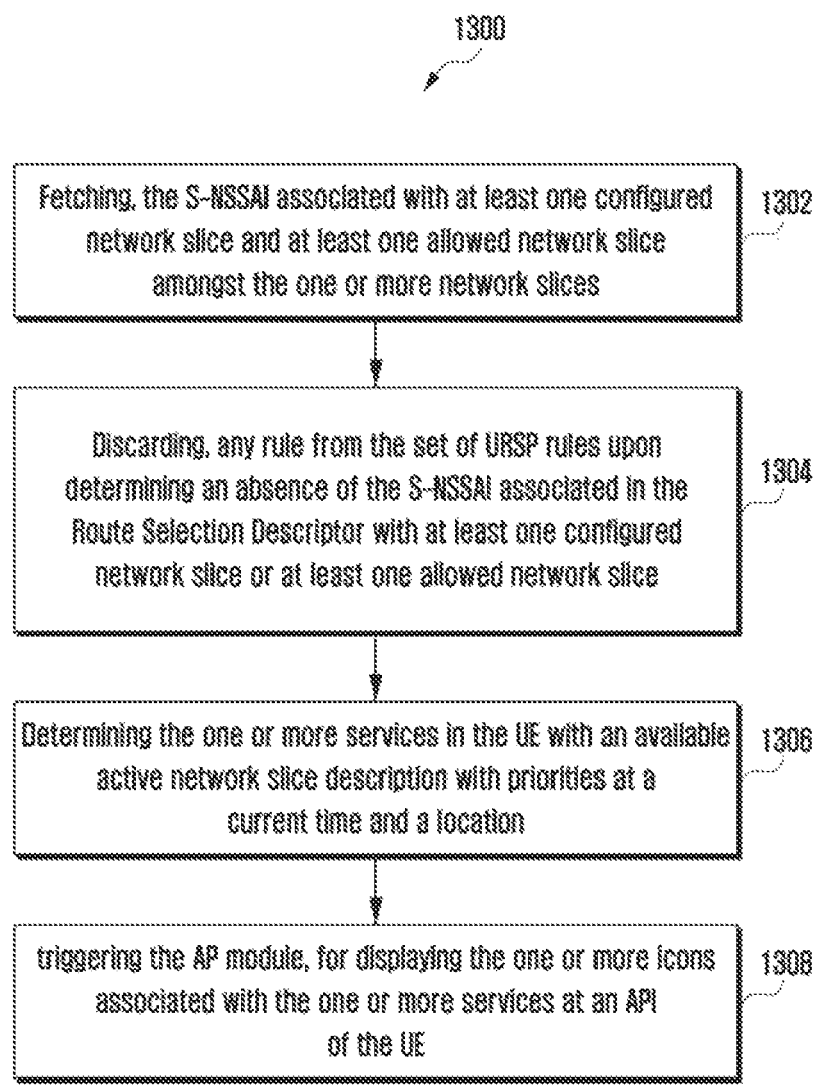

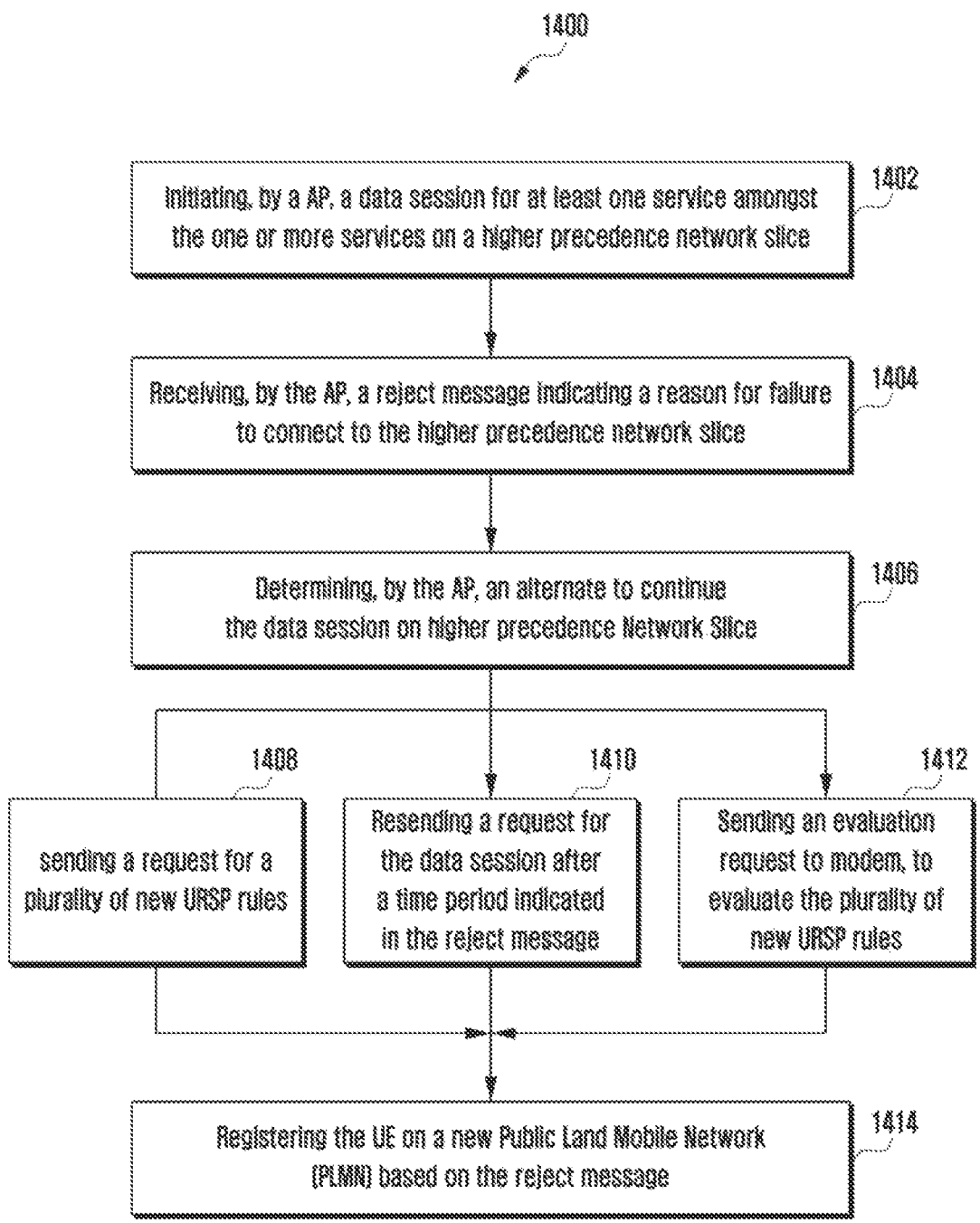

METHOD AND SYSTEMS FOR ENHANCING USER NETWORK SLICE EXPERIENCE

CROSS-REFERENCE TO RELATED APPLICATIONS

This application is a continuation of International Application No. PCT/KR2021/014411, filed on Oct. 15, 2021, in the Korean Intellectual Property Receiving Office and claiming priority to Indian Non-Provisional Patent Application No. 202142046809, filed on Oct. 13, 2021, in the Indian Intellectual Property Office, and Indian Provisional Application No. 202041045181, filed on Oct. 16, 2020, in the Indian Intellectual Property Office, the disclosures of which are incorporated by reference herein in their entireties

FIELD OF THE INVENTION

The present disclosure, in general, relates to network procedures performed at a User Equipment (UE), and, in particular, relates to systems and methods and systems for network slice enhancement in the UE.

BACKGROUND

A user has bought a subscription from operator for Ultra-High Speed Video for various Applications, mainly over the air media streaming applications. The network (NW) can guarantee a very high quality of service (QoS) for Ultra-High Speed Video by steering data through a specific Slice/data network name (DNN). In order to fulfil this, the NW needs to indicate the UE to tunnel the data traffic for video applications through a protocol data unit (PDU) session with the specified parameters. To implement this Policy Control Function (PCF) from the NW sends an updated UE Route Selection Policy (URSP) table to route the video application data through this PDU Session. Now, when the Video Application is started, it requests data service, then the UE will match this Application to the USRP Rule sent by NW, and create new PDU session with the attribute in the URSP, route video data through it. Table 1 illustrates a URSP table.

TABLE 1

| Example URSP rules | | |
|---|---|---|
| Traffic Flow Descriptor | Route Selection Descriptor (RSD) | Comments |
| Rule Precedence = 1 Traffic Descriptor: Application Identifiers=com.netflix.android Connection Capabilities="internet" Rule Precedence = lowest priority Traffic Descriptor: * | Route Selection Descriptor Precedence = 1 Network Slice Selection: Single - Network Slice Selection Assistance Information (S-NSSAI)-video DNN Selection: SpeedVideo Access Type preference: Multi-Access Route Selection Descriptor Precedence = 1 Network Slice Selection: S-NSSAI-Default Session and service continuity (SSC) Mode Selection: SSC Mode 3 DNN Selection: internet | This URSP rule associates the application "App3" and the Connection Capability "internet" with SpeedVideo, S-NSSAI-video and multi-access connectivity. It enforces the following routing policy: When the "com.netflix.android" requests a network connection with Connection Capability "internet", the UE establishes (if not already established) a MA PDU Session with SpeedVideo and S-NSSAI-video. After that, the UE routes the traffic of "com.netflix.android" over this MA PDU Session by using the received access traffic steering, switching and splitting (ATSSS) rules. This URSP rule associates all traffic not matching any prior rule a PDU Session with S-NSSAI-Default, SSC Mode 3 and the "internet" DNN. It enforces the following routing policy: All traffic not matching any prior rule should be transferred on a PDU session supporting S-NSSAI-Default, SSC Mode 3 and DNN=internet with no access network preference. |

When applications are running on a mobile operating system (OS), they may use some specific slices for data flow. Current State of Art Icon policy is limited to a UE radio access technology (RAT) where data is routed ($4^{th}$ generation (4G) or 4G+ or $5^{th}$ generation (5G) or 5G+, WiFi), a RAT where the UE is currently camped to and voice availability (high definition (HD) Voice, voice over long-term evolution (VoLTE) or voice over new radio (VoNR)). There are no icon policies defined per application (or group of applications). There are no differentiated Icon Policies for UE or applications, which have subscribed to higher QoS slices. There is no indication on the user interface (UI) that whether a user is using it or not and what advantages the user is getting through the slice. A subscription to a network slice can be provided by the operator alone or can be provided by operators based on Service level agreement with application, Operators and application developer can decide the icon policy based on URSP Rules to have a uniformity among all users. Current state of art doesn't have this provision.

In current state of art, there are no guaranteed bit rate (GBR) and QoS for certain applications/services which are introduced through the concept of Network Slicing. As Network Slicing provides a guarantee on the service to be provided, users must be shown some indications in the form of Icons to enhance their engagement and experience. Currently there is only one indication i.e. 5G icon, shown when UE is connected to 5G RAT. With Network Slices, multiple QoS can be differentiated with Interactive Icons. For example, currently, video streaming applications toggle the video quality (between 144p to 4K UHD) automatically based on data rate or latency which may fluctuate based on Network's bandwidth. With Network slicing, a user who is subscribed to a superior video streaming slice maybe shown its availability through pre-defined Icons even before opening any video streaming applications. Benefits of such icons would be:

1) Users may avoid the problem of video buffering by only opening the applications in public land mobile networks (PLMNs) or Tracking Areas supporting the Superior Video Streaming Slice.
2) On the basis of Icon displayed/not displayed, users may know the slice availability in various regions and can plan their subscription utilization/subscription renewal accordingly.
3) Another example would be that of Gaming services/applications. Users can be informed beforehand about the availability of Low Latency Gaming Slices through Icons.
4) Application can use the information to decide codec to use (e.g.—if connected to better QoS slice, streaming application start with HD if not start with standard definition (SD))

A slice based Icon can be shown when an application is active on screen and is using the slice. For Example, when any over the air media streaming application is open "Video Slice" icon is displayed. When user moves to Facebook, the Video Icon is removed and "Social Slice" Icon is displayed. In this example, the over the air media streaming application uses slice depicted by icon "video slice" and Facebook uses a slice depicted by icon by "social slice" Icons will change based on the active application usage. Also, for background downloads and uploads, Slice Icons may be displayed if they are actively using the Slice. When two or more application is simultaneously opened on screen (e.g. split screen or application on device and tethering), as an implementation, UI can show multiple icons corresponding to the slices being used or best slice being used.

UE shows icon based on camped RAT and PDU session established (RAT may be 5G, 4G, WiFi, PDU session such as internet protocol (IP) multimedia subsystem (IMS), Internet, Hotspot etc.). Currently there is no icon policy for network slices. UE shows icon for IMS and Internet PDU session when service is in use (e.g. UE shows VoLTE when IMS VoLTE is registered or Internet when Internet PDU session is connected). These icons are permanent icon and will be available until IMS is registered or Internet PDU session is active. It is static information and UE show icon based on the RAT, IMS service or PDU session for the internet is active.

Furthermore, when an application is running on a mobile OS, the application is not aware of network connection ability for 5G slices. If a network operator supports some slices for the application, the application does not know which network slices are possibly available to it. The data traffic flow is abstract from the point of view of the application. If the application is aware of the S-NSSAI and PDU Session Information then the application can use certain abilities like better security, low latency, better codecs and higher bandwidth to its advantage. Slice and PDU Session information is not currently advertised to Applications. When an application is triggered, MODEM starts to map the requirements to the traffic descriptors (TDs) and route section descriptor (RSDs) of URSP rules in order of precedence. Suppose we have three RSDs in a TD of a URSP rule as in Table 2.

TABLE 2

| Route Selection Descriptor (RSD) | RSD validation for establishing PDU session |
|---|---|
| Precedence = 1 RSD$_1$ with S-NSSAI$_a$ | "Time Window/Location Criteria" not satisfied |
| Precedence = 2 RSD$_2$ with S-NSSAI$_b$ | #26 insufficient resources; |
| Precedence = 3 RSD$_3$ with S-NSSAI$_c$ | PDU Session established |

In this case RSD3 will be chosen and a PDU session will be established. But RSD1 and RSD2 are higher precedence options and application will get a better QoS if they are selected. RSD1 is rejected because current time or location is not suitable to use this option. This information can be helpful for user as he might want to use the application with best services and he can then use the application in a suitable time. RSD2 is rejected since network doesn't have enough resources currently to allocate for this slice. MODEM will get to know this when it will send a PDU session establishment request. Once we relay this rejection cause to the application processor (AP), user will know there is a lot of traffic in higher priority slice. In current state of art, there is no transparency to the user on the process of accepting/rejecting a particular RSD and URSP rule. When MODEM receives request to establish data session, MODEM checks the TDs and if matching rule found, it checks RSDs for PDU session establishment (if not exist), it selects RSDs 3 (RSDs 1 and RSDs 2 can't be used as it is reject or not allowed for the current time), establish PDU session and sends data session connected with IP address to AP. MODEM doesn't indicate the reject causes of higher priority slices (in this example RSDs 1, RSDs 2) to AP.

FIG. 1 illustrates an operational flow diagram 100 depicting a process for receiving information related to one or more services. In an embodiment, applications send application specific info to an AP. Further, the AP generates a PDU session request (App ID, DNN, SSC Mode, etc.) to be sent to a modem. Further, after generating the PDU session request, the AP sends the request to the modem via an opaque interface with no slice transparency. The AP receives the generic information from a modem layer from the interface. Further, when the modem receives the request for the PDU Session establishment, the modem module maps to a URSP rule and tries to establish the PDU Session. The modem sends the PDU session request to MODEM and MODEM stores all configured URSP rules by network. Further, the modem module generates a response which has PDU session information (DNN, aggregate maximum bit rate (AMBR), S-NSSAI, QoS class identifier (QCI), etc.) and rote Routine PDU Session info to AP via the interface.

Thus, there is a need for a solution that overcomes the above deficiencies.

SUMMARY

Additional aspects will be set forth in part in the description which follows and, in part, will be apparent from the description, or may be learned by practice of the presented embodiments.

In accordance with an aspect of the disclosure, a method for network slice enhancement for a user equipment (UE) may include receiving, at an application processor (AP) from a modem, a list of UE route selection policy (URSP) rules, one or more network slice selection assistance information (S-NSSAI) associated with one or more network slices categorized among configured network slices, rejected network slices, requested network slices, and allowed network slices, and protocol data unit (PDU) session information, and maintaining, by the AP, a database to store information received at the AP. The one or more network slices execute one or more services at the UE.

In accordance with an aspect of the disclosure, a system for network slice enhancement for a UE may include a memory storing instructions and an processor configured to execute the instructions to receive, at an AP from a modem, a list of URSP rules, one or more S-NSSAI associated with one or more network slices categorized among configured network slices, rejected network slices, requested network slices, and allowed network slices, and PDU session information, and maintain, by the AP, a database to store information received at the AP. The one or more network slices execute one or more services at the UE.

According to this invention, the application can use certain abilities like better security, low latency, better codecs and higher bandwidth to its advantage.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 illustrates an operational flow diagram depicting a process for displaying one or more icons for one or more network slices at a UE, according to an embodiment;

FIG. 3 illustrates an operational flow diagram depicting a process for displaying one or more icons for one or more network slices at a UE based on a route selection policy precedence, according to an embodiment;

FIG. 4 illustrates an operational flow diagram depicting a process for displaying one or more icons for one or more network slices at a UE based on a network, according to an embodiment;

FIG. 5 illustrates an operational flow diagram depicting a process for displaying one or more icons for one or more network slices at a UE from web Application Programming Interface (API), according to an embodiment;

FIG. 6 illustrates an operational flow diagram depicting a process for indicating one or more services about one or more network slices, according to an embodiment;

FIG. 7 illustrates a tabular representation of URSP rules, according to an embodiment;

FIG. 8 is an example illustration of a 5G network slice visibility at a UE, according to an embodiment;

FIG. 9 is another example illustration of a 5G network slice visibility at a UE, according to an embodiment;

FIG. 12 illustrates an operational flow diagram depicting a process for a network slice enhancement for a 5G UE, according to an embodiment;

FIG. 14 illustrates an operational flow diagram depicting a process for a Network Slice Management for a 5G UE, according to an embodiment;

FIG. 18 illustrates a use case diagram for Coder decoders (CODECs), according to an embodiment of the present subject matter.

Figure 1:
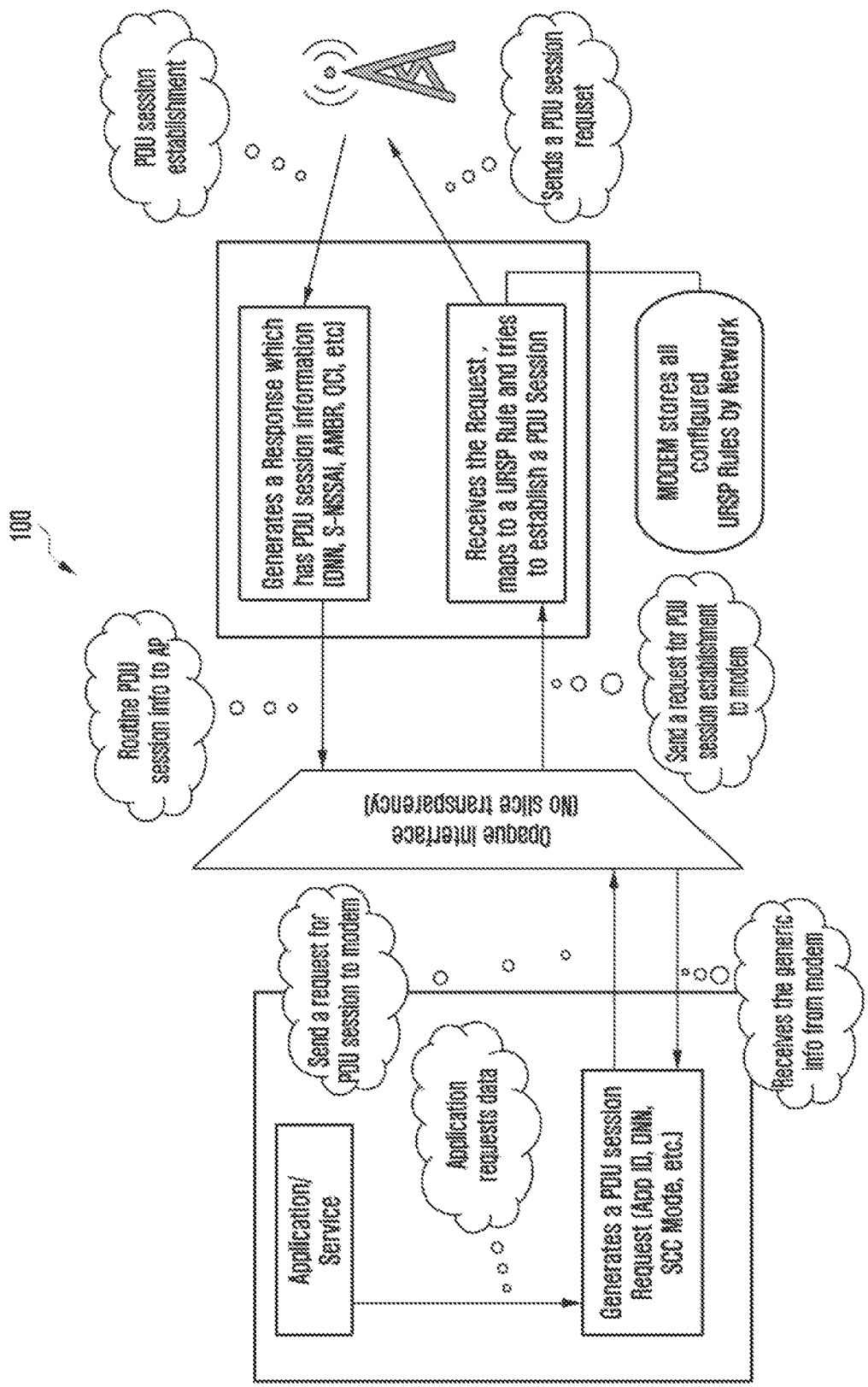
FIG. 1 illustrates an operational flow diagram depicting a process for receiving information related to one or more services.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF FIGURES

For promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises. a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

FIG. 2 illustrates a illustrates an operational flow diagram 200 depicting a process for displaying one or more icons for one or more network slices at a UE, according to an embodiment. In an embodiment, the one or more icons may determine a status associated with the one or more network slices. In an embodiment, the one or more icons may be displayed to indicate an active usage of one or more network slices subscribed by one or more services at the UE. In an embodiment, the one or more icons may be stored in the UE. In an embodiment, the one or more icons may be stored in a memory in the UE.

Continuing with the above embodiment, the method may include initiating (operation 202), by a modem incorporated in the UE, a PDU session establishment with a network. In an embodiment, the PDU session may be initiated by transmitting one of a PDU session establishment request, a PDU session modification, and a Non-Access Stratum (NAS) message by the UE to the network by the modem. In an embodiment, the modem may be triggered to initiate the PDU session upon receiving a data connection from the AP, that may instruct the modem to initiate a PDU session establishment or initiate Protocol Data Unit (PDU) session with the network. In an embodiment, in response to initiating the PDU session, the method may proceed towards receiving a PDU session establishment response at the modem from the network. In an embodiment, the PDU session establishment response, the PDU session modification, and the NAS message may include a service descriptive text, one of a uniform resource locator (URL) for the one or more icons, the one or more icons, and an indication to form a Fully Qualified Domain Name (FQDN) with Single-Network Slice Selection Assistance Information (S-NSSAI) for the one or more icons associated with the S-NSSAI. In an embodiment, the S-NSSAI may be associated with the one or more network slices.

Moving forward, the method may proceed towards receiving (operation 204), by the AP, an indication about one or more network slices being active for the PDU session from at least one of a modem and the network. In an embodiment, the AP may further receive, icon information for at least one other active PDU session available at the modem. In an embodiment, the icon information may be updated based on receiving on of a NAS message and new icon information related to an existing PDU session from the network. In an embodiment, the one or more icons may be stored in the memory prior to displaying the one or more icons.

Subsequent to receiving the indication about the one or more network slices being active, the method may include displaying (operation 206), by the AP, the one or more icons associated with the one or more network slices on an interface of the UE. In an embodiment, the process may further include classifying, by the AP, the one or more services based on the S-NSSAI associated with the one or more services. In an embodiment, the one or more icons may be displayed based on one or more of a Standardized Slice/Service of the S-NSSAI associated with the one or more network slices currently active in the UE. Examples of the Standardized Slice/Service of the one or more network slices may include, enhanced Mobile Broadband (eMBB), Ultra Reliable Low Latency Communications (URLLC), massive Machine Type Communications (mMTC), Vehicle-to-everything (V2X) and High-Performance Machine-Type Communications (HMTC). In an embodiment, the one or more icons may be displayed by the AP on an API at the UE. Furthermore, the process may include updating, by the AP, the one or more icons displayed based on a data activity, the one or more services, QoS Flow Identifiers (QFIs), and GBR associated to the PDU session. In an embodiment, the one or more icons may be shared by the network to display the one or more icons based on one or more RRC States. Examples of the RRC states may include an RRC idle mode, an RRC connected mode and an RRC inactive mode.

FIG. 3 illustrates an operational flow diagram 300 depicting a process for displaying one or more icons for one or more network slices at a UE based on a route selection policy precedence, according to an embodiment. In an embodiment, the one or more icons may determine a status associated with the one or more network slices. In an embodiment, the one or more icons may be displayed to indicate an active usage of the one or more network slices subscribed by one or more services at the UE.

In an embodiment, the route selection policy precedence may be based on a URSP table. In an embodiment, the route selection policy precedence may indicate an icon policy determined by one or more Original Equipment Manufacturer (OEMs). In an embodiment, the URSP table may include a list of URSP rules. Furthermore, the list of URSP rules may include one or more traffic flow descriptors, one or more RSDs. Furthermore, the one or more RSDs may include the one or more icons. In an embodiment, the one or more icons may be displayed based on the one or more RSDs used for a PDU session establishment.

Continuing with the above embodiment, the process may include receiving (operation 302) information associated with the one or more RSDs from a modem in the UE. In an embodiment, the information may be received from a modem in the UE by the AP. In an embodiment, the information may include a route selection descriptor precedence.

Subsequent to receiving the one or more RSDs from the network, the process may proceed towards initiating (operation 304) a PDU session by the UE with the network. In an embodiment, the PDU session may be initiated by the modem incorporated within the UE. In an embodiment, the PDU session may be established upon initiation by the UE based on the list of URSP rules. In an embodiment, the modem may be triggered to initiate the PDU session upon receiving a data connection from the AP, that may instruct the modem to initiate a PDU session establishment or initiate PDU session with the network.

In response to receiving the information, the process may proceed towards displaying (operation 306) the one or more icons based on the route selection descriptor precedence. In an embodiment, the one or more icons may be displayed by the AP on an interface of the UE. In an embodiment, the route selection descriptor precedence may be associated with the URSP table. In an embodiment, the one or more icons may be displayed based on the PDU session between the UE and the network. In an embodiment, the one or more icons may be displayed based on the active PDU session and a URSP table.

FIG. 4 illustrates an operational flow diagram 400 depicting a process for displaying one or more icons for one or more network slices at a UE based on a network, according to an embodiment. In an embodiment, the UE has an active PDU session with the network. In an embodiment, the one or more icons may determine a status associated with the one or more network slices. In an embodiment, the one or more icons may be displayed to indicate an active usage of the one or more network slices subscribed by one or more services at the UE.

Continuing with the above embodiment, the process may include configuring (operation 402) a list of URSP rules by the network for the UE. In an embodiment, the list of URSP rules may be configured based on a Service-Level Agreement (SLA) with an application developer or specific policies enabled by operator for the set of application based on UE subscription. In an embodiment, the list of URSP rules may include one or more traffic flow descriptors, one or more RSDs. Furthermore, the one or more RSDs may include the one or more icons, a FQDN to fetch the one or more icons, and a URL to fetch the one or more icon. In an embodiment, the process may include configuring a service-based icon policy based on a URSP table including the one or more RSDs including Slice/Service Type (SST) and Slice Differentiator (SD). In an embodiment, the icon policy may be depicted by an icon policy table including the SST and the SD, the one or more RSDs, a category, and the one or more icons associated with the category. In an embodiment, the SST may be a URLLC. In an embodiment, examples of the category may include, music, video, voice calling and video calling, and gaming. In an embodiment, the one or more RSDs may be "Route_Selection_Descriptor1(Precedence: 1, SSC Mode: 3, DNN: Internet, Network Slice Selection: S-NSSAI1, S-NSSAI2)", and "Route_Selection_Descriptor2(Precedence: 3, SSC Mode: 1, DNN: IMS, Network Slice Selection: S-NSSAI4, S-NSSAI5)".

Table 3 depicts an example of icon policy table. In an embodiment, the icon policy table may be configured by the network.

TABLE 3

| (Slice/Service Type) | Route Selection Descriptors | Category | Icons Used |
|---|---|---|---|
| URLLC (Ultra Reliable Low Latency Communications) | Route_Selection_Descriptor$_1$(Precedence: 1, SSC Mode: 3, DNN: Internet, Network Slice Selection: S-NSSAI$_1$, S-NSSAI$_2$) | Music Video | |
| | Route_Selection_Descriptor$_2$(Precedence: 3, SSC Mode: 1, DNN: IMS, Network Slice Selection: S-NSSAI$_4$, S-NSSAI$_5$) | Voice and Video calling Gaming | |

Subsequent to configuring the list of URSP rules, the process may include transmitting one or more of a list of URLs, and a list of FQDNs, an indication to use the list of FQDNs with the S-NSSAI to the modem in the UE. In an embodiment, each URL may be FQDNs constructed by S-NSSAI. In an embodiment, the list of URLs/FQDN may be transmitted by the network. Furthermore, the list of URLs/FQDN may include at least one icon corresponding to URLs/FQDN. In an embodiment, the S-NSSAI may be associated with the one or more network slices and the one or more RSDs to the modem. In an embodiment, the list of URLs/FQDN may be provided to the UE by one of Policy Control Function in the URSP and a Session Management Function during one of a PDU session establishment procedure, a PDU session modification procedure and a NAS message.

In response to configuring of the list of URSP rules by the network for the UE, the process may proceed towards indicating (operation 404) the list of URSP rules, and the list of URLs/FQDN to the AP module from the modem. In an embodiment, the process may further include indicating by the modem, the AP module about the S-NSSAI and the one or more RSDs utilized for establishing the PDU session between the UE and the network. In an embodiment, the S-NSSAI and the one or more RSDs may be mapped to a PDU session.

Moving forward, the process may proceed towards establishing (operation 406) a PDU session by the modem incorporated with the UE with the network. In an embodiment, the modem may be triggered to initiate the PDU session upon receiving a data connection from the AP, that may instruct the modem to initiate a PDU session establishment or initiate the PDU session with the network. In an embodiment, the PDU session may be initiated by transmitting one of a PDU session establishment request, a PDU session modification, and a NAS message by the UE to the network by the modem.

Upon establishment of the PDU session, the process may further include fetching (operation 408) the one or more icons stored in the memory. Furthermore, the memory may include at least one icon corresponding to one or more PDU Sessions. Subsequently, in an embodiment, where it is determined that the at least one icon is not identified by the AP module from the from the memory for the one or more PDU sessions, the process may proceed towards step 410. In an embodiment, where it is determined that the at least one icon is identified and corresponding icon update timer is not expired, the process may terminate. In an embodiment, where it is determined that the at least one icon is identified and icon update timer is expired, the process may proceed towards step 410.

Continuing with the above embodiment, upon determining one of the at least one icon is not identified by the AP module from the from the memory for the one or more PDU sessions and the icon update timer has expired, the process may further include fetching (operation 410) at least one icon amongst the one or more icons from the list of URLs/FQDN corresponding to the S-NSSAI and the one or more RSDs utilized for establishing the PDU session. In an embodiment, the at least one icon may be fetched by the AP module along with an icon update timer.

Continuing with the above embodiment, the process may include displaying (operation 412) the one or more icons on a user Interface of the UE by the AP. Furthermore, the UE may store the one or more icons associated with one or more PDU Sessions with the S-NSSAI in the memory with corresponding icon update timer.

In an embodiment, the displayed icon is updated periodically through step 410 followed by step 412 on expiry of any stored icon update timers.

FIG. 5 illustrates an operational flow diagram 500 depicting a process for displaying one or more icons for one or more network slices at a UE from web API, according to an embodiment. In an embodiment, the network and the UE may have established one or more PDU Sessions. In an embodiment, the one or more icons may determine a status associated with the one or more network slices. In an embodiment, the one or more icons may be displayed to indicate an active usage of the one or more network slices subscribed by one or more services at the UE.

Continuing with the above embodiment, the process may include updating (operation 502) a list of URSP rules with S-NSSAI and one or more RSDs present in an URSP table. In an embodiment, the updating may be performed by the network at the UE. In an embodiment, the S-NSSAI may be associated with the one or more network slices. In an embodiment, the list of URSP rules may include one or more traffic flow descriptors, the one or more RSDs. Furthermore, the process may include updating and caching by the AP module an icon policy as depicted in the URSP table.

In response to updating of the list of URSP rules, the process may include transmitting (operation 504) the updated list of URSP rules to the AP module. In an embodiment, the transmitting may be performed by the modem. Moving forward, the process may include indicating (operation 506) by the modem the S-NSSAI and the one or more RSDs utilized for the establishing the PDU session to the AP.

Subsequently, the process may include generating (operation 506) a unique key by the AP module based on the updated list of URSP rules. Examples of the unique key may include, but are not limited to, the FQDN associated with the S-NSSAI, and one or more keys provided in the URSP table.

Upon generation of the unique key, the process may include fetching (operation 508) the one or more icons by the AP module from the web API. In an embodiment, the web API may include the unique key. In an embodiment, the unique key at the web API may be similar to the unique key generated by the AP module. In an embodiment, the unique key at the web API may be generated by an operator. In an embodiment, the AP module may be indicated by the network for utilizing at least one of a RESTful API and a CAPIF for fetching the one or more icons. Moving forward, the process may include fetching, by the AP, the one or more icons through at least one of the RESTful API and the CAPIF.

In response to receiving the indication, the process may include displaying the one or more icons the UE (operation 512). In an embodiment, the one or more icons may be selected by the AP module upon browsing through the one or more icons stored in a memory of the UE. In an embodiment, the one or more icons may be stored in a database in the memory.

FIG. 6 illustrates an operational flow diagram 600 depicting a process for indicating one or more services about one or more network slices, according to an embodiment. In an embodiment, the one or more services may be installed in a UE and the one or more network slices may be subscribed by the UE.

Continuing with the above embodiment, the process may include transmitting (operation 602), by the modem, an indication to the AP module including S-NSSAI associated with a PDU Session and at least one service amongst the one or more services available in the UE and in a network coverage in an area through a call back API.

Subsequently, the process may include receiving (operation 604), by the API, the indication associated with the S-NSSAI and the at least one service available in the network coverage.

Moving forward, the process may proceed towards displaying (operation 606), by the API, the one or more network slices available in the network coverage. In an embodiment, the AP may further display a highlighted icon associated with the at least one service, a semi-highlighted icon associated with at least another service unavailable in the network coverage based on the indication on the API. In an embodiment, the at least one other service may include a network slice subscription. In an embodiment, the network slice may be amongst the one or more network slices. In an embodiment, the AP may further display an icon associated with at least one alternative service based on the indication.

FIG. 7 illustrates a tabular representation 700 of URSP rules, according to an embodiment. In an embodiment, the tabular representation 700 may interchangeably be referred as a URSP table. In an embodiment, the URSP table may be configured to provide a route selection policy precedence to the UE. In an embodiment, the URSP table may include a list of URSP rules. Furthermore, the list of URSP rules may include one or more traffic flow descriptors, one or more RSDs. Furthermore, the one or more RSDs may include the one or more icons. In an embodiment, the route selection policy precedence may indicate an icon policy determined by one or more OEMs and Mobile Network Operators (MNOs). In an embodiment, the one or more icons may be displayed based on the one or more RSDs used for a PDU session establishment or any NAS message.

FIG. 8 is an example illustration 800 of a user 5G network slice visibility at a UE, according to an embodiment. In an embodiment, by implementing a solution provided by the present subject matter, if a user is using a video application that is supposed to use a specific network slice, the user may be provided with an icon and a service message description like "You are now enjoying Ultra-High-Speed Video Pack" from an operator. In an embodiment, the video application may be one or more services a referred in the FIG. 1. Alternatively, each slice related application information can also be displayed.

FIG. 9 is another example illustration 900 of a 5G network slice visibility at a UE, according to an embodiment. In an embodiment, by implementing a solution provided by the present subject matter, if a user is using a gaming application that is supposed to use a specific network slice, the user may be provided with an icon and a service message description like "You are now enjoying "Ultra-Low Latency Gaming Pack" from an operator. In an embodiment, the gaming application may be one or more services a referred in the FIG. 1. Alternatively, each slice related application information can also be displayed.

Figure 10:
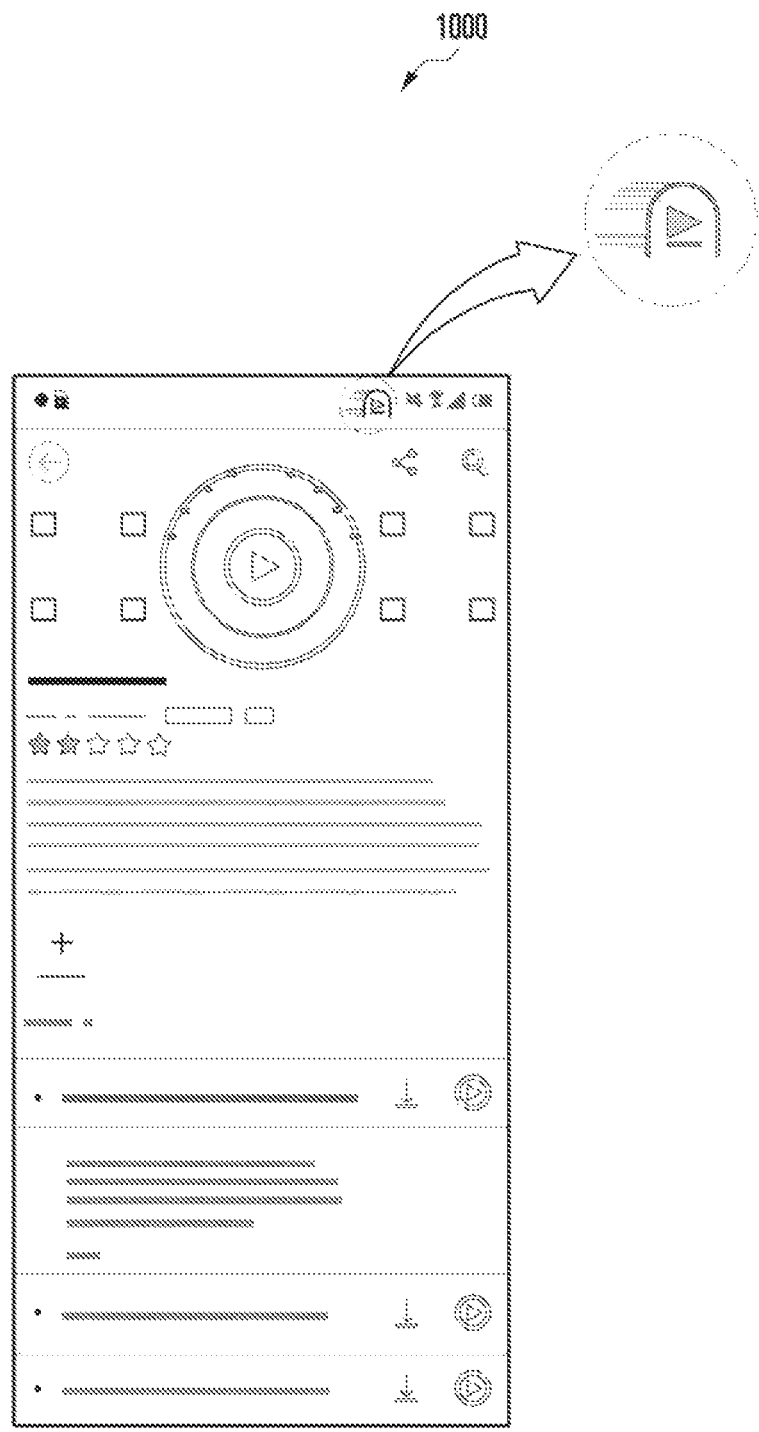
FIG. 10 illustrates a flow diagram depicting a process for receiving 5G network slice visibility by a UE, according to an embodiment.

FIG. 10 illustrates a flow diagram 1000 depicting a process for receiving 5G network slice visibility by a UE, according to an embodiment. In an embodiment, a slice activity icon may be shown on an AP notification area. The slice activity icon may be shown based on a Standardized SST of an active slice. Examples may include, but are not limited to, eMBB, URLLC, mMTC, V2X and HMTC. For further enhancement of a user experience, OEMs and operators may agree on various service specific icons. The service specific icons may be displayed on the AP notification area, to indicate an active usage of a service subscription. A modem may indicate the AP module on the active slices for PDU Sessions. The AP module may use the indication to show agreed upon icon. Further, the slice activity may also be shown on an application, through an API.

Further, according to an embodiment, the slice activity icon may also be shown based on a Route Selection Policy Precedence. An URSP Rule table—icon policy may be decided by the OEMs and MNOs. Further, the modem may indicate the AP module, the icon to display. Upon creation of the PDU session one the modem through a URSP rule, the slice icon may be displayed. Later, the slice icon may be differentiated on based on the route selection descriptor precedence. Accordingly, the modem may indicate AP module, the Precedence of the PDU session and based on the precedence, the AP may show an agreed upon icon.

Figure 11:
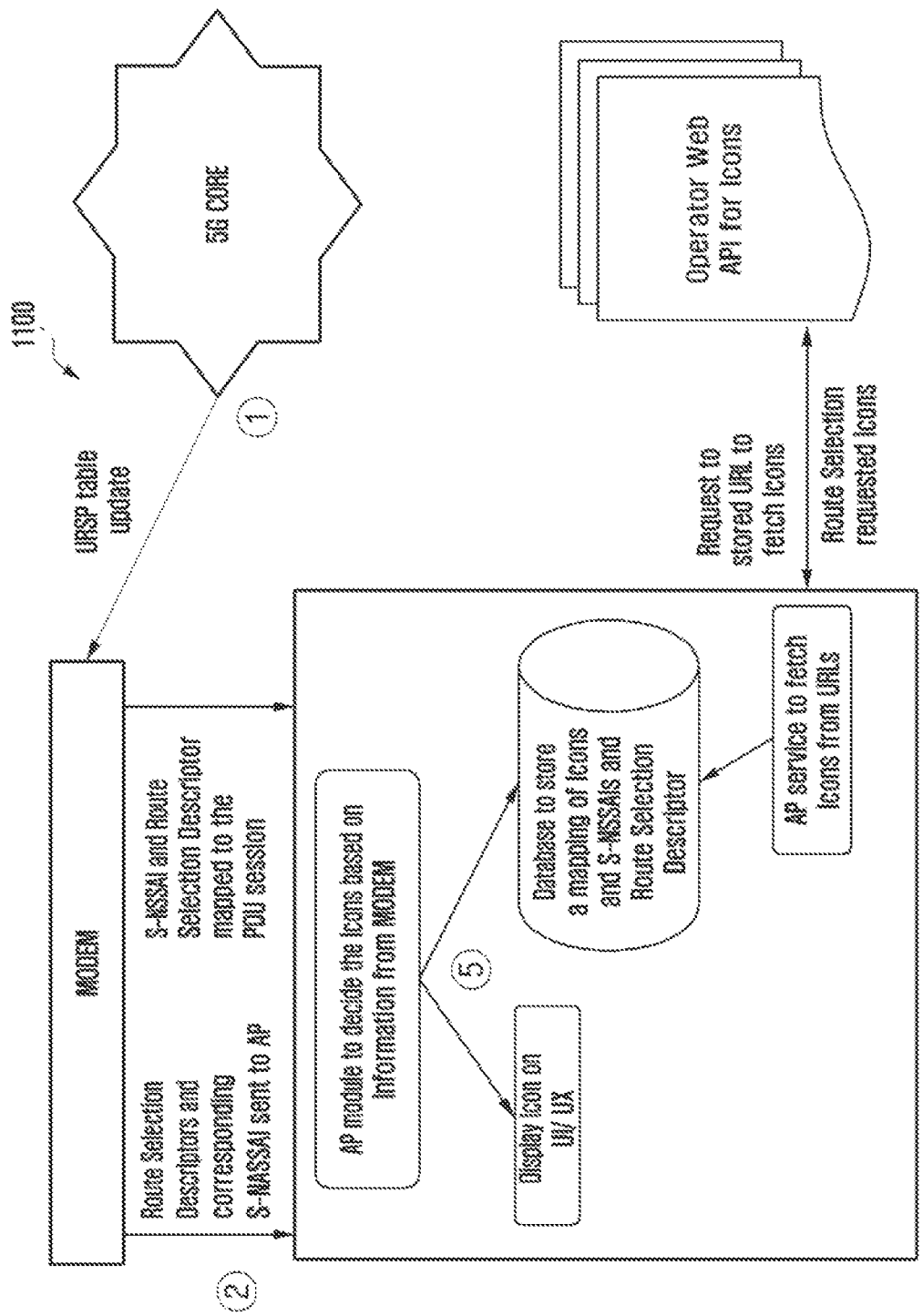
FIG. 11 illustrates a block diagram depicting a process to indicate an icon policy to an AP through a web API, according to an embodiment.

FIG. 11 illustrates a block diagram 1100 depicting a process to indicate an icon policy to an AP module through a web API, according to an embodiment. In an embodiment, a network updates a UE URSP table with S-NSSAIs in one or more RSDs along with other parameters. The update may be a trigger for the AP module to update an icon policy associated with the AP module cache the icon policy. Further, a modem may provide the URSP table with the one or more RSDs to the AP. Moving forward, the AP module may make a unique key with the one or more RSDs, and an operator may make the same unique key in the operator's web API. Accordingly, the AP may fetch all icons from the Web API, provided by the operator. When a PDU session is established for a service, the modem may indicate the S-NSSAAIs and the one or more RSDs used for the PDU session to the AP module. Further, the AP module may browse through the icons stored that matches to a tuple received from the modem and display the icon at a UI.

Further, in an embodiment, the icon for a PDU Session may be available in a PDU Session Establishment Accept message. In an embodiment, there may be a new Information Element (IE) in the PDU Session Establishment Accept message from a network to show the icon. The IE may contain an URL for the icon or the icon. The IE may also include a service description text for a user. Further, multiple icons may be shared by the network to show each one on the basis of a RRC Idle/Inactive/Connected, or on the basis of a number of applications mapped, a number of user Application IP tuples associated. The icons may also be set to update based on certain app conditions, such as application service registration/deregistration, new QFI enabled, GBR assigned, URSP priority, number of data radio bearers (DRBs) associated, current bandwidth (BW) or the like.

Further, in an embodiment, there may an indication based on standard slice type. According to the embodiment, there may be standard slice type such as eMBB, URLLC, mMTC, V2X and HMTC or the like. Any application mapped to the slices may be shown with a different icon.

FIG. 12 illustrates an operational flow diagram 1200 depicting a process for a network slice enhancement for a 5G UE, according to an embodiment.

Continuing with above embodiment, the process may include receiving (operation 1202) at an AP module from a modem, a list of URSP rules, one or more S-NSSAI associated with one or more network slices categorized among configured, rejected, requested and allowed network slices and PDU session information. In an embodiment, the list of URSP rules, the one or more S-NSSAI associated with one or more network slices categorized among configured, rejected, requested and allowed network slices and the PDU session information may also be referred as information. In an embodiment, the information may be received by the AP module through generating an API within the AP at the UE.

In an embodiment, the API may be configured for informing the one or more services within the UE about a number of events. Examples of the number of events may include a PDU Session Establishment Accept, a PDU session modification, a PDU session release, a PDU session reject procedure and one or more NAS mobility and session management related procedures. In an embodiment, the API may further be configured for updating the one or more services with data related parameters comprising one or more of a reject cause, a SSC mode, a PDU session type, a QoS rules, a Session AMBR, a 5G system (5GS) network feature support, network slice information, a 5GS mobile (5GSM) capability and a multi access support.

Subsequently, the process may further include maintaining (operation 1204), by the AP module, a database to store information received at the AP, wherein the one or more network slices execute one or more services at the UE.

Figure 13:
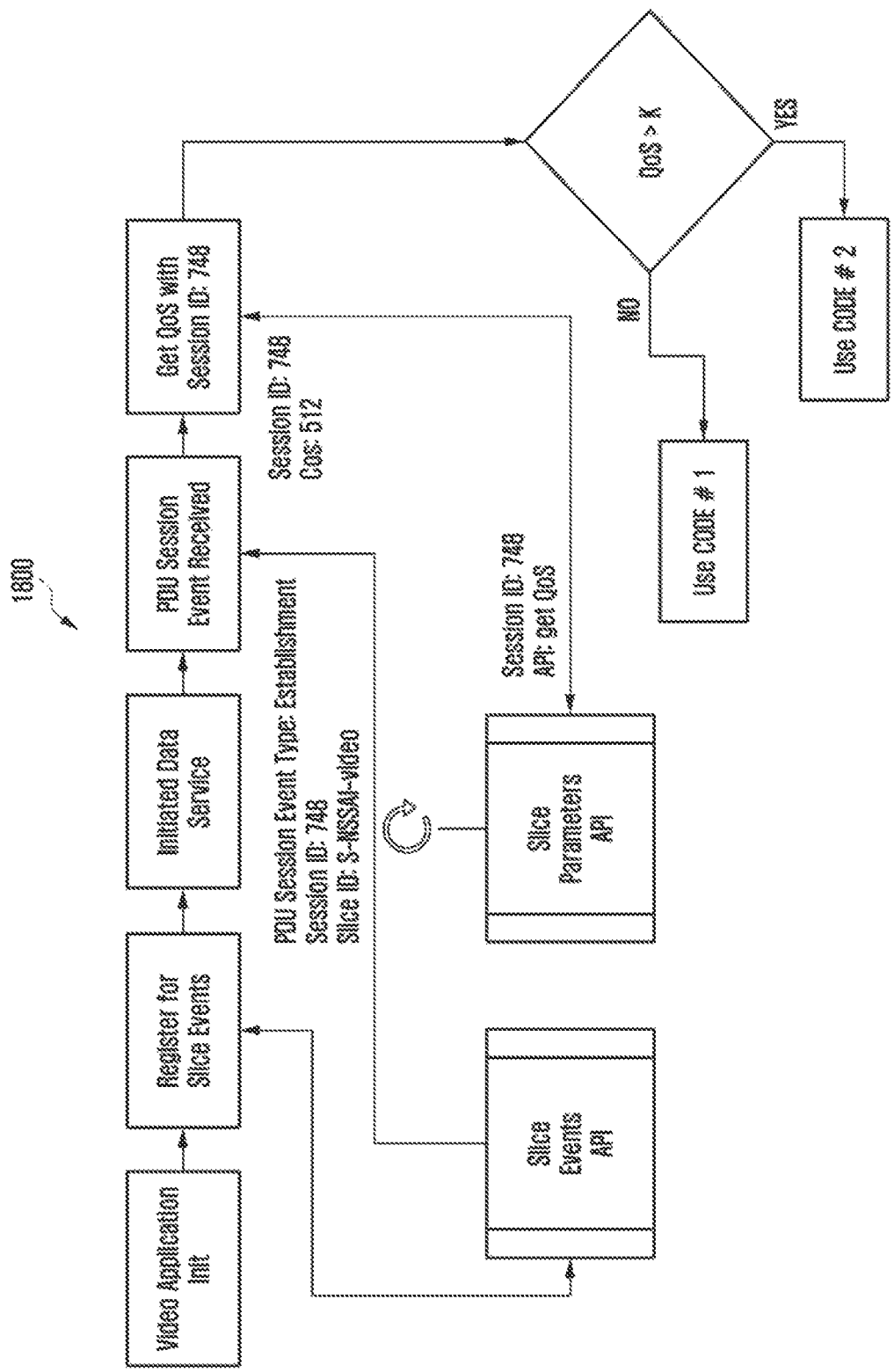
FIG. 13 illustrates an operational flow diagram depicting a process for displaying one or more icons associated with one or more Subscriber Identity Modules (SIMs) in a UE, according to an embodiment.

FIG. 13 illustrates an operational flow diagram 1300 depicting a process for displaying one or more icons associated with one or more SIMs in a UE, according to an embodiment. In an embodiment, the one or more icons may correspond to one or more services in the UE. In an embodiment, the one or more SIMs may include a subscription for the one or more services at the UE. In an embodiment, the one or more services may be executed at the UE through one or more network slices subscribed by the one or more services at the UE. In an embodiment, the one or more icons may be displayed at an API generated by an AP module at the UE. In an embodiment, the one or more icons may be displayed to show a subscription associated with the one or more network slices in a particular network registration area for each SIM.

Continuing with the above embodiment, the process may include fetching (operation 1302), the S-NSSAI associated with at least one configured network slice and at least one allowed network slice amongst the one or more network slices. In an embodiment, the NSSAI associated with at least one configured network slice and at least one allowed network slice amongst the one or more network slices may be fetched from information received by the AP through the API. In an embodiment, the information may include the list of URSP rules, the one or more S-NSSAI associated with one or more network slices categorized among configured, rejected, requested and allowed network slices and PDU session information In response to fetching the information, the process may include discarding (operation 1304), any rule from the set of URSP rules upon determining an absence of the S-NSSAI associated in the Route Selection Descriptor with at least one configured network slice or at least one allowed network slice.

Subsequently, the process may further include determining (operation 1306) the one or more services in the UE with an available active network slice description with priorities at a current time and a location. In an embodiment, the determining may be performed by accessing a database associated with the one or more services at the UE in a memory. In an embodiment, the database may be associated with the one or more services in the UE. In an embodiment, the database may further include corresponding one or more network descriptors including APP_ID, IP 3 tuples, Connection Capability requirements ("V2X", "Internet", "ProSe", etc.), specific DNNs, FQDNs, and one or more non-IP descriptors.

Moving forward, the process may proceed towards, triggering (operation 1308), the AP, for displaying the one or more icons associated with the one or more services with a service descriptive text at an API of the UE. In an embodiment, the one or more icons may be displayed corresponding to the one or more SIMs. In an embodiment, the one or more icons may be displayed in an order based on a number of factors. In an embodiment, the number of factors may include the one or more services associated with the list of URSP rules in an order of the list of URSP rules precedence, most used one or more services, most recently used one or more services. In an embodiment, the one or more icons may be displayed within a Dedicated Data Subscription (DDS) selection menu on a UI of the UE. Furthermore, the one or more icons associated with the one or more services may correspond to the one or more SIMs.

FIG. 14 illustrates an operational flow diagram 1400 depicting a process for a Network Slice Management for a 5G UE, according to an embodiment. In an embodiment, one or more network slices may be managed based on one or more services and one or more SIMs of a UE.

Continuing with the above embodiment, the process may include initiating (operation 1402), by the UE, a data session for at least one service amongst the one or more services on a higher precedence network slice. In an embodiment, the data session may be a PDU session between the UE and the network initiated by the UE. In an embodiment, the data session may be initiated by the modem. In an embodiment, the data session may be initiated upon receiving a data connection from the AP. In an embodiment, the data connection may instruct the modem to initiate a PDU session establishment or initiate PDU session with the network.

Subsequently, the process may proceed towards receiving (operation 1404), a reject message indicating a reason for failure to connect to the higher precedence network slice. In an embodiment, the reason for failure may be based on one of an operator determined barring, insufficient resources, missing or unknown DNN, user authentication or authorization failed, service option not supported, requested service option not subscribed, out of local area data network (LADN) service area, insufficient resources for specific slice and DNN, not supported SSC mode, insufficient resources for specific slice, and missing or unknown DNN in a network slice.

Moving forward, the process may include determining (operation 1406) an alternate to continue the data session on higher precedence Network Slice. Continuing with the above embodiment, the process may further include performing at least one of steps 1408, step 1410 and step 1412.

Subsequently, the process may include sending (operation 1408) a request for a plurality of attributes in the one or more RSDs of the plurality of URSP rules. In an embodiment, the plurality of attributes may include setting one or more new attributes such as one or more of S-NSSAI, an Access Point Name (APN), other TD parameter and RSD parameter, a minimum precedence value of one of a one or more TDs, and the one or more RSDs through which the UE may establish a connection.

Moving forward, the process may include resending (operation 1410) a request for the data session after a time period indicated in the reject message;

Furthermore, the process may include sending (operation 1412) by the AP, an evaluation request to the modem, to re-evaluate the plurality of new URSP rules; and Continuing with the above embodiment, the process may include registering (operation 1414) the UE on a new PLMN based on the reject message. In an embodiment, the reject message may determine that the one or more services is not available on a current PLMN. In an example embodiment, the UE may try to establish the PDU session for a network slice, or the UE may try to establish a session with one of the one or more TDs, and the one or more RSDs with a minimum precedence value unavailable due to S-NSSAI being absent from an allowed list.

In an embodiment, the new PLMN may be manually selected by fetching by the AP an allowed S-NSSAI associated with at least one PLMN and the list of URSP rules from a web API with a UE ID and a location associated with the UE. In an embodiment, the PLMN may be selected manually by fetching by the AP, the allowed S-NSSAI associated with at least one PLMN and the list of URSP rules through a one of a Steering of Roaming (SoR) Container transport, NAS transport procedure or a UE Configuration Update (UCU) procedure of a Home Public Land Mobile Network (HPLMN). Furthermore, the PLMN may be selected manually by fetching by the AP the allowed S-NSSAI associated with at least one PLMN and the list of URSP rules by temporarily registering on each scanned virtual PLMN (VPLMN) providing an allowed S-NSSAI with a mapped HPLMN S-NSSAI utilized to check the URSP rules for the session establishment.

In an embodiment, the PLMN may be selected automatically when the UE is in a roaming area. In an embodiment, in the roaming area, fetching the S-NSSAI associated with the at least one configured network slice and the at least one allowed network slice may be based on determining by the AP a probability of utilizing the one or more services in the UE by a user through a Machine Learning (ML) module. In an embodiment, the probability may be based on a previous history of utilizing one or more services by the user. In an embodiment, determining the probability of utilizing the one or more services in the UE by the user through the ML module may be based on monitoring over a period of time, a historical utilization the one or more services by the user. In an embodiment, the process may further include upon monitoring the historical utilization, determining, the probability of utilizing the one or more services by the user after the said period of time.

Moving forward, the process may include updating (operation 1416) by the AP a database in the UE. In an embodiment, the database may include mapped S-NSSAI and a URSP table. In an embodiment, the updating may be performed with the web API when the allowed S-NSSAI associated with at least one PLMN and the list of URSP rules is fetched from the web API. In an embodiment, the updating may be performed with one of SoR container transport, the NAS transport procedure and the UCU procedure when the allowed S-NSSAI associated with at least one PLMN and the list of URSP rules is fetched through one of the SoR container transport, the NAS transport procedure and the UCU procedure of the HPLMN. Moving forward, the updating may be performed upon temporarily registering on each scanned VPLMN when the Allowed S-NSSAI associated with at least one PLMN and the list of URSP rules is fetched by temporarily registering on each scanned VPLMN.

In an embodiment, DDS selection menu on a UI of the UE is assisted by displaying the one or more icons corresponding to individual SIM. Continuing with the above embodiment, the process may include displaying by the AP one or more icons for the one or more services associated with the Allowed S-NSSAIs and URSP rules corresponding to individual SIM.

Figure 15:
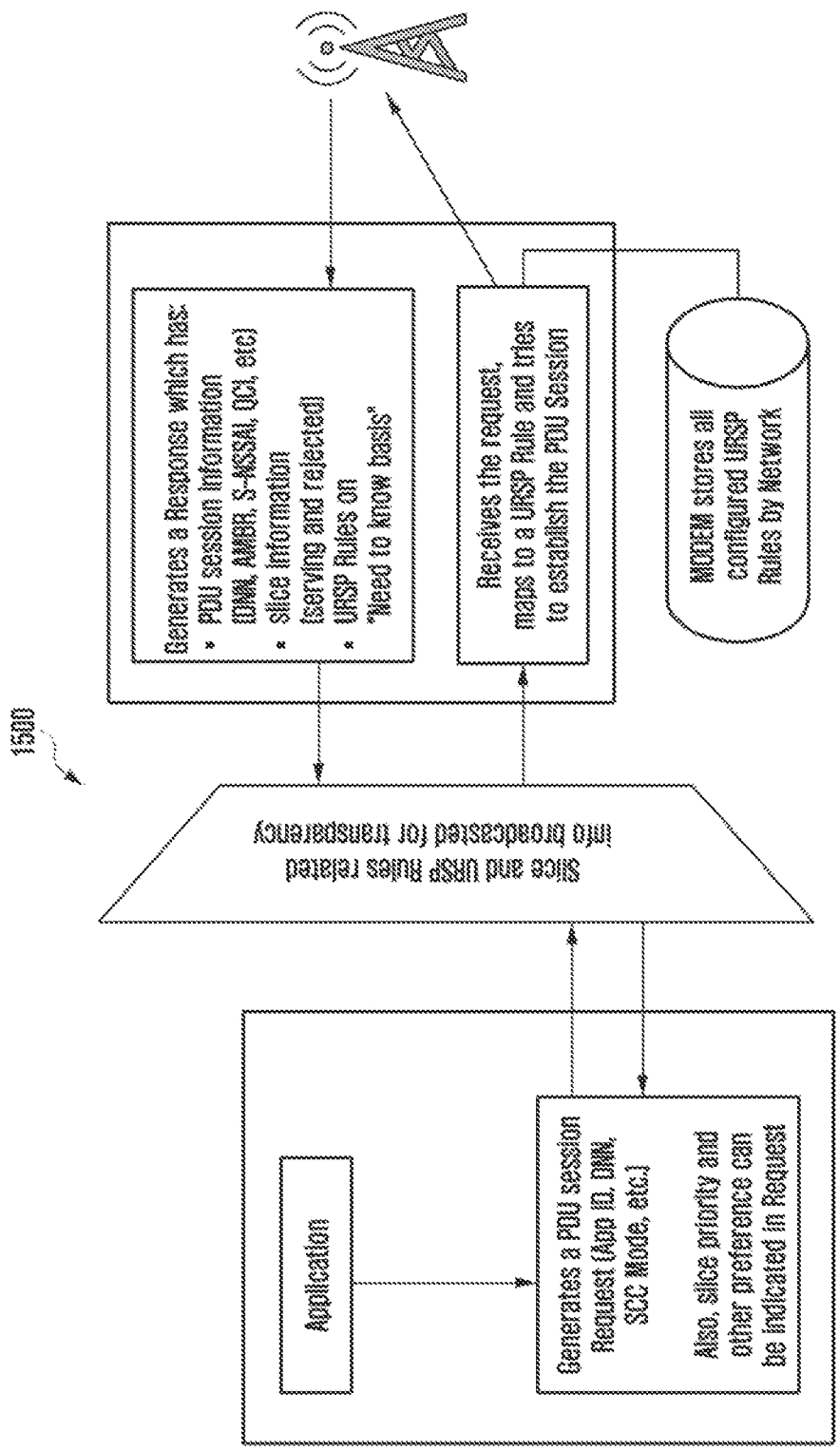
FIG. 15 illustrates a schematic block diagram for slice information awareness, according to an embodiment.

FIG. 15 illustrates a schematic block diagram 1500 for slice information awareness, according to an embodiment. In an embodiment, a slice related information (S-NSSAI) may be shared with an AP. In an embodiment, the AP may be configured to generate a PDU session request (APP_ID, DNN, NSSAI, SCC Mode, etc.) with a network. In an embodiment, the PDU session request may include a slice priority and at least one other preference. The AP may receive PDU session information and serving slice information for enhancing an interface of a UE. Further, the interface may broadcast one or more network slices and URSP rules related information for transparency. Further, in response to the PDU session request, a CP may generate a response including PDU session information (DNN AMBR, QCI, etc), slice information (serving and rejected), and the URSP Rules on "Need to know basis". Further, in an embodiment, the URSP Rules and active and reject slices amongst the one or more network slices may be broadcasted as per need basis such as showing Icons for better QoS Slices, providing serving slice details to enhance a user experience, providing rejected slice details, indicating the URSP Rules stored to tweak Traffic Descriptor of data requesting one or more services to avoid a slice congestion. The response is then routed to the AP to establish the session.

Figure 16:
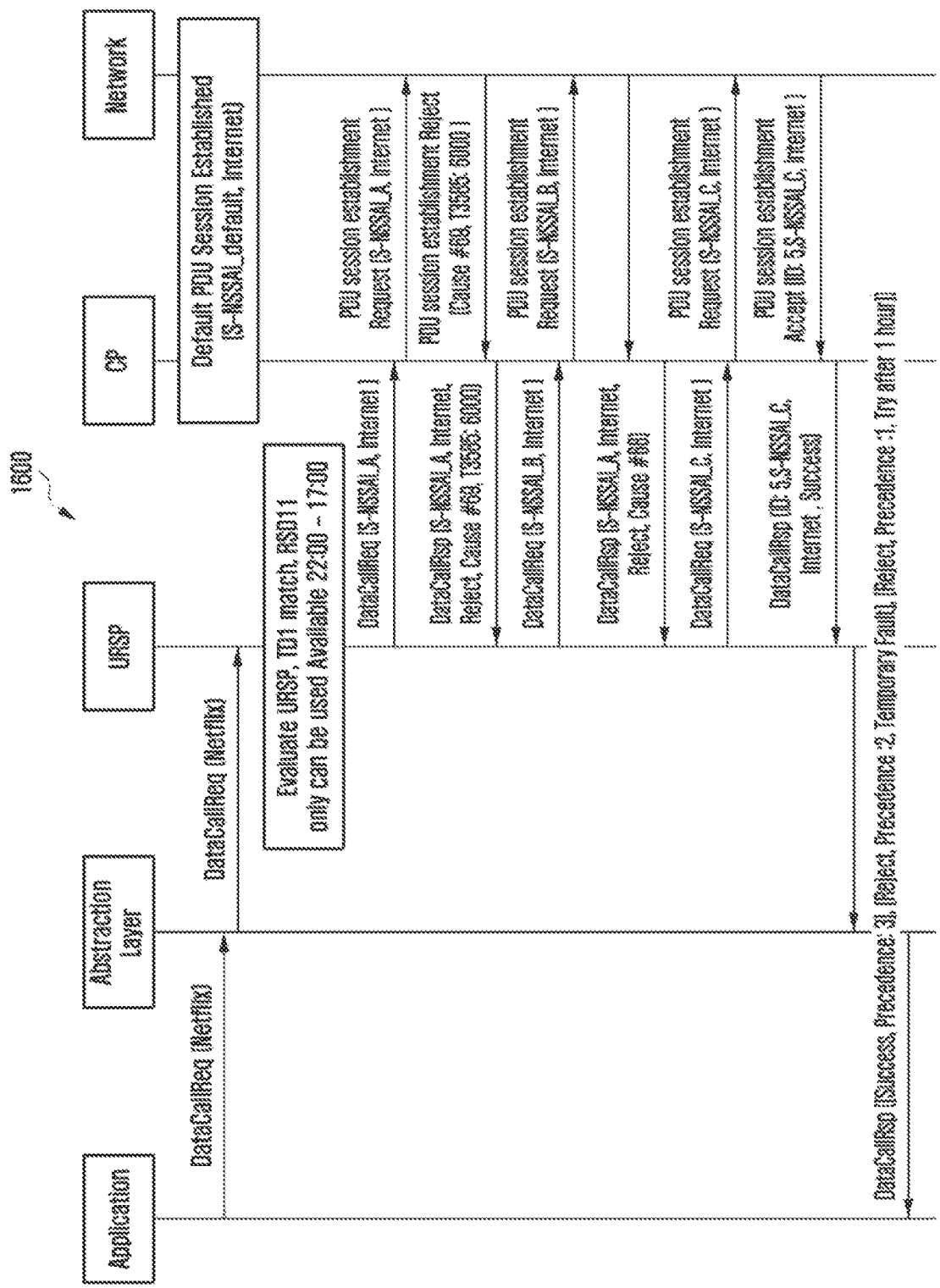
FIG. 16 illustrates a use case line diagrams depicting a PDU session reject causes and relaying of PDU Session Accept information to an Application Processor through an abstract layer, according to an embodiment.

FIG. 16 illustrates a use case line diagrams depicting a PDU session reject causes and relaying of PDU Session Accept information to an Application Processor through an abstract layer, according to an embodiment.

Figure 17:
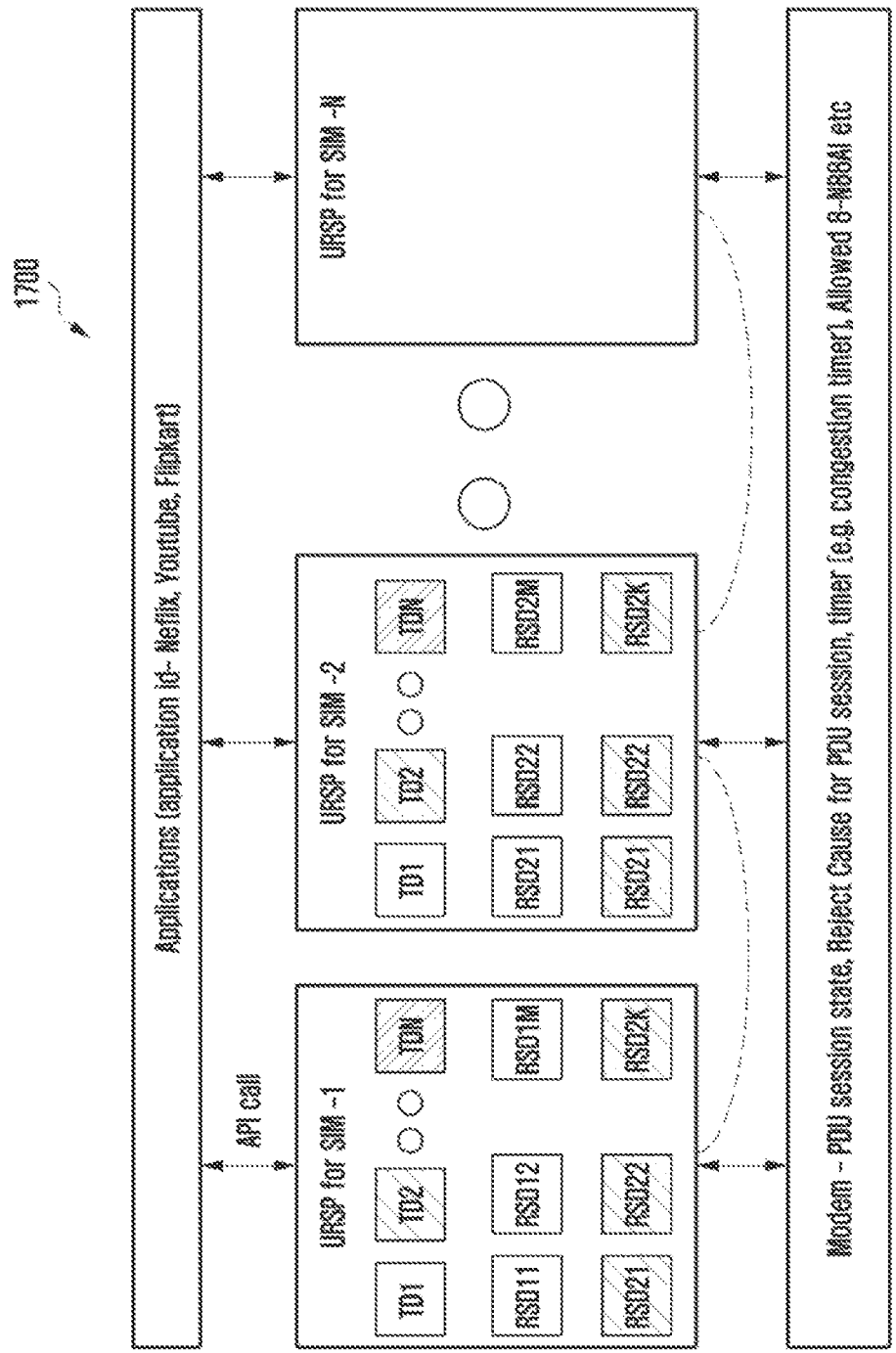
FIG. 17 illustrates a schematic block diagram for use case implementation of FIG. 16, according to an embodiment.

FIG. 17 illustrates a schematic block diagram 1700 for use case implementation of FIG. 16, according to an embodiment. In an embodiment, a TD1 may include an application id and a RSD for the TD1 may include a route selection descriptor. Further, an RSD11=DNN as Internet and S-NSSAI_A, precedence 1. RSD12=DNN as Internet and S-NSSAI_B, precedence 2. In an embodiment, a user may set the data preference on SIM 1 or currently SIM 1 is being used for the data. Further dotted lines may indicate an interaction between URSPs of different SIMs. When the Application starts, the application may request for a call establishment (application may use parameters such as priority, minimum QoS support or the like). Further, priority means, whether application may want to camp to any slice in the route selection descriptor or referred slice only (precedence 1 slice or up to precedence 2). If a precedence is defined, a UE may try establishing a PDU session with TD with corresponding precedence. Further application may use the information to show information like "on best network".

FIG. 18 illustrates a use case diagram 1800 for Coder decoders (CODECs), according to an embodiment of the present subject matter. Codecs are used by applications for data compression and decompression to transfer data, For Example: CODEC #1 for video uses more battery but requires less data rate, CODEC #2 for video uses less battery but requires more data rate. A flow diagram is proposed for optimal switch between CODEC #1 and CODEC #2.

Figure 19:
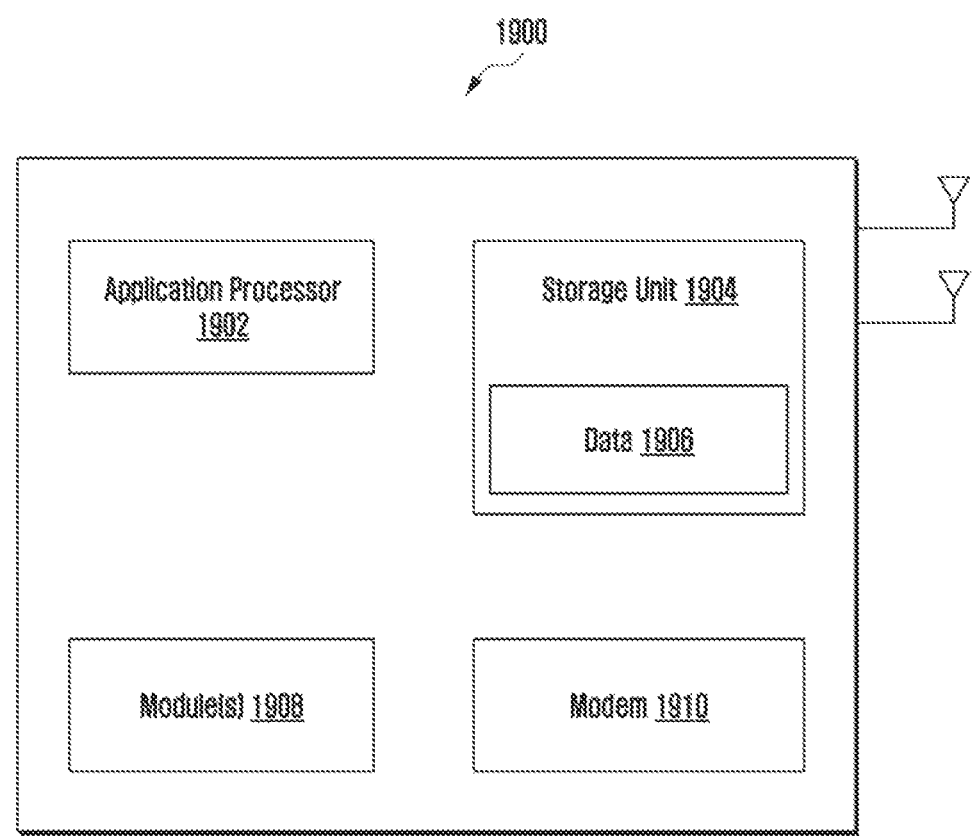
FIG. 19 is a diagram illustrating the configuration of a terminal in a wireless communication system according to an embodiment of the present subject matter.

FIG. 19 is a diagram illustrating the configuration of a terminal 1900 in a wireless communication system according to an embodiment of the present subject matter. Hereinafter, it is understood that terms including "unit" or "er" at the end may refer to the unit for processing at least one function or operation and may be implemented in hardware, software, or a combination of hardware and software.

Referring to FIG. 19, the terminal 1900 may include an AP 1902 (e.g., at least one processor), a memory 1904 (e.g., storage), data 1906 and, module(s) 1908, and a modem 1910 (e.g., communicator or communication interface). By way of example, the terminal 1900 may be a UE, such as a cellular phone or other device that communicates over a plurality of cellular networks (such as a 4G, a 5G or pre-5G network or any future wireless communication network). In an embodiment, the AP 1902, the memory 1904, the data 1906, and the module(s) 1908, and the modem 1910 may be communicably coupled with one another.

As would be appreciated, the terminal 1900, may be understood as one or more of a hardware, a software, a logic-based program, a configurable hardware, and the like. In an example, the AP 1902 may be a single processing unit or a number of units, all of which could include multiple computing units. The processor may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the AP 1902 may be configured to fetch and/or execute computer-readable instructions and/or data 1906 stored in the memory 1904.

In an example, the memory 1904 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 1904 may store data, such as a basic program, an application program, configuration information, and the like for operating the terminal 1900. The memory 1904 may be configured as a volatile memory, a non-volatile memory, or a combination of a volatile memory and a non-volatile memory. The memory 1904 may include the data 1906. In addition, the memory 1904 may provide data stored therein in response to a request from the AP 1902.

The data 1906 serves, amongst other things, as a repository for storing data processed, received, and generated by one or more of, the AP 1902, the memory 1904, the module(s) 1908, and the modem 1910.

The module(s) 1908, amongst other things, may include routines, programs, objects, components, data structures, etc., which perform particular tasks or implement data types. The module(s) 1908 may also be implemented as, signal processor(s), state machine(s), logic circuitries, and/or any other device or component that manipulate signals based on operational instructions.

Further, the module(s) 1908 may be implemented in hardware, instructions executed by at least one processing unit, for e.g., AP 1902, or by a combination thereof. The processing unit may be a general-purpose processor which executes instructions to cause the general-purpose processor to perform operations or, the processing unit may be dedicated to performing the required functions. In another aspect of the present disclosure, the module(s) 1908 may be machine-readable instructions (software) which, when executed by a processor/processing unit, may perform any of the described functionalities.

In some example embodiments, the module(s) 1908 may be machine-readable instructions (software) which, when executed by a processor/processing unit, perform any of the described functionalities.

The AP 1902 may control overall operations of the terminal 1900. For example, the AP 1902 may transmit and receive a signal via the modem 1910. Further, the AP 1902 records data in the memory 1904 and reads the recorded data. The AP 1902 may perform the functions of a protocol stack required by a particular communication standard. To this end, the AP 1902 may include at least one processor or micro-processor or may be a part of the processor. Also, a part of the modem 1910 and the AP 1902 may be referred to as a communication processor (CP).

Referring to FIG. 2, the AP 1902 may be configured to initiate a data connection, that may instruct the modem 1910 to initiate a PDU session establishment or initiate PDU session with a network. In an embodiment, initiating the PDU session may include receiving a PDU session establishment response at the modem 1910 from the network. In an embodiment, the PDU session establishment response may be received upon transmitting a PDU session establishment request from the modem 1910 to the network. In an embodiment, the PDU session establishment response may include a service descriptive text, one of a URL for the one or more icons, the one or more icons and an indication to form a FQDN with S-NSSAI for the one or more icons associated with the S-NSSAI. In an embodiment, the S-NSSAI may be associated with the one or more network slices.

Furthermore, in response to initiation of the PDU session, the AP 1902 may be configured to receive an indication about one or more network slices being active for the PDU session from at least one of a modem 1910 and the network. In an embodiment, the AP 1902 may further receive, icon information for at least one other active PDU session available at the modem 1910. In an embodiment, the icon information may be updated based on receiving on of a NAS message and new icon information related to an existing PDU session from the network In an embodiment, the one or more icons may be stored in a memory 1904 prior to displaying the one or more icons.

Subsequent to receiving the indication about the one or more network slices being active, the AP 1902 may be configured to display the one or more icons associated with the one or more network slices on an interface of the UE.

In an embodiment, the AP 1902 may further be configured to classify the one or more services based on the S-NSSAI associated with the one or more services. In an embodiment, the one or more icons may be displayed based on one or more of a Standardized Slice/Service of the S-NSSAI associated with the one or more network slices currently active in the UE. Examples of the Standardized Slice/Service of the one or more network slices may include, eMBB, URLLC, mMTC, V2X and HMTC.

In an embodiment, the one or more icons may be displayed based on one or more of a Standardized Slice/Service of the one or more network slices. Examples of the Standardized Slice/Service of the one or more network slices may include, eMBB, URLLC, mMTC, V2X and HMTC. In an embodiment, the one or more icons may be displayed by the AP 1902 on an API at the UE. Furthermore, the AP 1902 may be configured to update the one or more icons displayed based on a data activity, the one or more services, QFIs, and GBR associated to the PDU session. In an embodiment, the one or more icons may be shared by the network to display the one or more icons based on one or more RRC States. Examples of the RRC states may include an RRC idle mode, an RRC connected mode and an RRC inactive mode.

Referring to FIG. 3, a process for displaying one or more icons for one or more network slices at a UE based on a route selection policy precedence is disclosed. In an embodiment, the one or more icons may determine a status associated with the one or more network slices. In an embodiment, the one or more icons may be displayed to indicate an active usage of the one or more network slices subscribed by one or more services at the UE.

In an embodiment, the route selection policy precedence may be based on a URSP table. In an embodiment, the route selection policy precedence may indicate an icon policy determined by one or more OEMs. In an embodiment, the URSP table may include a list of URSP rules. Furthermore, the list of URSP rules may include one or more traffic flow descriptors, one or more RSDs. Furthermore, the one or more RSDs may include the one or more icons. In an embodiment, the one or more icons may be displayed based on the one or more RSDs.

Continuing with the above embodiment, the AP 1902 may be configured to receive information associated with the one or more RSDs from the modem 1910 in the UE. In an embodiment, the information may include a route selection descriptor precedence.

Subsequent to receiving the one or more RSDs from the network, the UE may be configured to initiate a PDU session with the network. In an embodiment, the PDU session may be initiated by the modem 1910. In an embodiment, the PDU session may be established upon initiation by the UE based on the list of URSP rules. In an embodiment, the modem 1910 may be triggered to initiate the PDU session upon receiving a data connection from the AP 1902, that may instruct the modem to initiate a PDU session establishment or initiate PDU session with the network.

In response to receiving the information, the AP 1902 may be configured to display the one or more icons based on the route selection descriptor precedence on an interface of the UE. In an embodiment, the route selection descriptor precedence may be associated with the URSP table. In an embodiment, the one or more icons may be displayed based on the PDU session between the UE and the network. In an embodiment, the one or more icons may be displayed based on the active PDU session and a URSP table.

Referring back to FIG. 4, a process for displaying one or more icons for one or more network slices at a UE based on a network is disclosed. In an embodiment, the network and the UE may be connected in a PDU session with one another. In an embodiment, the one or more icons may determine a status associated with the one or more network slices. In an embodiment, the one or more icons may be displayed to indicate an active usage of the one or more network slices subscribed by one or more services at the UE.

Continuing with the above embodiment, the network may configure a list of URSP rules by the network for the UE. In an embodiment, the list of URSP rules may be configured based on a SLA with an application developer or specific policies enabled by operator for the set of application based on UE subscription. In an embodiment, the list of URSP rules may include one or more traffic flow descriptors, one or more FSDs. Furthermore, the one or more RSDs may include the one or more icons, a FQDN to fetch the one or more icons, and a URL to fetch the one or more icon. In an embodiment, the network may configure a service-based icon policy based on a URSP table including the one or more RSDs including SST and SD. In an embodiment, the icon policy may be depicted by an icon policy table including the SST and the SD, the one or more RSDs, a category, and the one or more icons associated with the category. In an embodiment, the SST may be a URLLC. In an embodiment, examples of the category may include, music, video, voice calling and video calling, and gaming. In an embodiment, the one or more RSDs may be "Route_Selection_Descriptor1 (Precedence: 1, SSC Mode: 3, DNN: Internet, Network Slice Selection: S-NSSAI1, S-NSSAI2)", and "Route_Selection_Descriptor2(Precedence: 3, SSC Mode: 1, DNN: IMS, Network Slice Selection: S-NSSAI4, S-NSSAI5)".

Subsequent to configuring the list of URSP rules, the network may transmit one or more of a list of URLs, and a list of FQDNs, an indication to use the list of FQDNs with the S-NSSAI to the modem in the UE. In an embodiment, each URL may be FQDNs constructed by S-NSSAI. Furthermore, the list of URLs/FQDN may include at least one icon corresponding to S-NSSAI. In an embodiment, the S-NSSAI may be associated with the one or more network slices and the one or more RSDs to the modem. In an embodiment, the list of URLs/FQDN may be provided to the UE in the URSP or a network provide such as a 5G Session Management Function during one of a PDU session establishment procedure and a PDU session modification procedure. In an embodiment, network may further provide information of the icon policy through REST API support or through Common API Framework (CAPIF) in URSP or during the PDU session establishment procedure or PDU session modification procedure or through any other NAS message.

In response to configuring of the list of URSP rules by the network for the UE and receiving the list of URLs, and a list of FQDNs, an indication to use the list of FQDNs with the S-NSSAI, the modem 1910 may be configured to indicate the list of URSP rules, and the list of URLs/FQDN to the AP 1902. In an embodiment, the modem 1910 may further be configured to indicate the AP 1902 about the S-NSSAI and the one or more RSDs utilized for establishing the PDU session between the UE and the network. In an embodiment, the S-NSSAI and the one or more RSDs may be mapped to a PDU session.

Moving forward, the modem 1910 may be configured to establish a PDU session with the network. In an embodiment, the modem 1910 may be triggered to initiate the PDU session upon receiving a data connection from the AP 1902, that may instruct the modem 1910 to initiate a PDU session establishment or initiate the PDU session with the network. In an embodiment, the PDU session may be initiated by transmitting one of a PDU session establishment request, a PDU session modification, and a NAS message by the UE to the network by the modem.

Upon establishment of the PDU session, the AP 1902 may be configured to fetch the one or more icons stored in the memory 1904. Furthermore, the memory 1904 may include at least one icon corresponding to one or more PDU Sessions.

Subsequently, in an embodiment, where it is determined that the at least one icon is not identified by the AP 1902 from the from the memory 1904 for the one or more PDU sessions, the AP 1902 may be configured to fetch at least one icon amongst the one or more icons from the list of URLs/FQDN corresponding to the S-NSSAI and the one or more RSDs utilized for establishing the PDU session.

Continuing with the above embodiment, the AP 1902 may be configured to display the one or more icons on a user interface of the UE. Furthermore, the UE may store the one or more icons associated with one or more PDU Sessions with the S-NSSAI in the memory 1904 by anyone. In an exemplary embodiment, the at least one icon may be fetched by one of a web API, the REST API, and the URSP table or the like.

Referring to FIG. 5 a process for displaying one or more icons for one or more network slices at a UE from web API is disclosed. In an embodiment, the network and the UE may be connected in a PDU session with one another. In an embodiment, the one or more icons may determine a status associated with the one or more network slices. In an embodiment, the one or more icons may be displayed to indicate an active usage of the one or more network slices subscribed by one or more services at the UE.

Continuing with the above embodiment, the network may be configured to update a list of URSP rules with S-NSSAI and one or more RSDs present in an URSP table. In an embodiment, the S-NSSAI may be associated with the one or more network slices. In an embodiment, the list of URSP rules may include one or more traffic flow descriptors, the one or more RSDs. Furthermore, the AP 1902 may be configured to update and cache an icon policy as depicted in the URSP table.

In response to updating of the list of URSP rules, the modem 1910 be configured to transmit the updated list of URSP rules to the AP 1902. Subsequently, the AP 1902 may be configured to generate a unique key based on the updated list of URSP rules. Examples of the unique key may include, but are not limited to, the FQDN associated with the S-NSSAI, and one or more keys provided in the URSP table.

Upon generation of the unique key, the AP 1902 may be configured to fetch the one or more icons by the AP 1902 from the web API. In an embodiment, the web API may include the unique key. In an embodiment, the unique key at the web API may be similar to the unique key generated by the AP 1902. In an embodiment, the unique key at the web API may be generated by an operator. In an embodiment, the AP 1902 may be indicated by the network for utilizing at least one of a RESTful API and a CAPIF for fetching the one or more icons. Moving forward, the AP 1902 may be configured to fetch the one or more icons through at least one of the RESTful API and the CAPIF.

Moving forward, the modem 1910 may be configured to indicate the S-NSSAI and the one or more RSDs utilized for the establishing the PDU session to the AP 1902. In response to receiving the indication, the AP 1902 may be configured to display the one or more icons on the API of the UE. In an embodiment, the one or more icons may be selected by the AP 1902 upon browsing through the one or more icons stored in a memory of the UE. In an embodiment, the one or more icons may be stored in a database in the memory. Furthermore, the one or more icons may be selected by the AP 1902 upon determining that the one or more icons matches the S-NSSAI and the one or more RSDs utilized for establishing the PDU session.

Referring back to FIG. 6, a process for indicating one or more services about one or more network slices is disclosed. In an embodiment, the one or more services may be installed in a UE and the one or more network slices may be subscribed by the UE.

Continuing with the above embodiment, the modem 1910 may be configured to transmit an indication to the AP 1902 including S-NSSAI associated with a PDU Session and at least one service amongst the one or more services available in the UE and in a network coverage in an area through a call back API.

Subsequently, the AP 1902 may be configured to receive at the API, the indication associated with the S-NSSAI and the at least one service available in the network coverage.

Moving forward, the AP 1902 may be configured to display at the API, the one or more network slices available in the network coverage. In an embodiment, the AP 1902 may further display a highlighted icon associated with the at least one service, a semi-highlighted icon associated with at least another service unavailable in the network coverage based on the indication on the API. In an embodiment, the at least one other service may include a network slice subscription. In an embodiment, the network slice may be amongst the one or more network slices. In an embodiment, the AP 1902 may further display an icon associated with at least one alternative service based on the indication.

Referring back to FIG. 12, a process for a network slice enhancement for a 5G UE is disclosed. Continuing with above embodiment, the AP 1902 may be configured to receive from the modem 1910, a list of URSP rules, one or more S-NSSAI associated with one or more network slices categorized among configured, rejected, requested and allowed network slices and PDU session information. In an embodiment, the list of URSP rules, the one or more S-NSSAI associated with one or more network slices categorized among configured, rejected, requested and allowed network slices and the PDU session information may also be referred as information. In an embodiment, the information may be received by the AP 1902 through generating an API within the AP 1902 at the UE.

In an embodiment, the API may be configured for informing the one or more services within the UE about a number of events. Examples of the number of events may include a PDU Session Establishment Accept, a PDU session modification, a PDU session release, a PDU session reject procedure and one or more NAS mobility and session management related procedures. In an embodiment, the API may further be configured for updating the one or more services with data related parameters comprising one or more of a reject cause, a SSC mode, a PDU session type, a QoS rules, a Session AMBR, a 5GS network feature support, network slice information, a 5GSM capability and a multi access support.

Subsequently, the AP 1902 may be configured to maintain a database to store information received at the AP 1902, wherein the one or more network slices execute one or more services at the UE.

Referring to FIG. 13, a process for displaying one or more icons associated with one or more SIMs in a UE for assisting a DDS selection is disclosed. In an embodiment, the one or more icons may correspond to one or more services in the UE. In an embodiment, the one or more SIMs may include a subscription for the one or more services at the UE. In an embodiment, the one or more services may be executed at the UE through one or more network slices subscribed by the one or more services at the UE. In an embodiment, the one or more icons may be displayed at an API generated by the AP 1902 at the UE. In an embodiment, the one or more icons may be displayed to show a subscription associated with the one or more network slices in a particular network registration area for each SIM.

Continuing with the above embodiment, the AP 1902 may be configured to fetch the S-NSSAI associated with at least one configured network slice and at least one allowed network slice amongst the one or more network slices from information received through the API. In an embodiment, the information may include the list of URSP rules, the one or more S-NSSAI associated with one or more network slices categorized among configured, rejected, requested and allowed network slices and PDU session information In response to fetching the information, the AP 1902 may be configured to discard any rule from the set of URSP rules upon determining an absence of the S-NSSAI associated in the Route Selection Descriptor with at least one configured network slice or at least one allowed network slice.

Subsequently, A P 1902 may be configured to determine the one or more services in the UE with an available active network slice description with priorities at a current time and a location. In an embodiment, the determining may be performed by accessing a database associated with the one or more services at the UE in a memory. In an embodiment, the database may be associated with the one or more services in the UE. In an embodiment, the database may further include corresponding one or more network descriptors including APP_ID, IP 3 tuples, Connection Capability requirements ("V2X", "Internet", "ProSe", etc.), specific DNNs, FQDNs, and one or more non-IP descriptors.

Moving forward, AP 1902 may be configured to display the one or more icons associated with the one or more services at an API of the UE. In an embodiment, the one or more icons may be displayed corresponding to the one or more SIMs. In an embodiment, the one or more icons may be displayed in an order based on a number of facts. In an embodiment, the number of factors may include the one or more services associated with the list of URSP rules in order of the list of URSP rules precedence, most used one or more services, most recently used one or more services. In an embodiment, the one or more icons may be displayed within a DDS selection menu on a UI of the UE. Furthermore, the one or more icons associated with the one or more services may correspond to the one or more SIMs.

Referring back to FIG. 14, a process for a Network Slice Management for a 5G UE, according to an embodiment is disclosed. In an embodiment, one or more network slices may be managed based on one or more services and one or more SIMs of a UE.

Continuing with the above embodiment, the modem 1902 may be configured to initiate a data session for at least one service amongst the one or more services on a higher precedence network slice. In an embodiment, the data session may be a PDU session between the UE and the network. In an embodiment, the data session may be initiated upon receiving a data connection from the AP 1902. In an embodiment, the data connection may instruct the modem 1910 to initiate a PDU session establishment or initiate PDU session with the network.

Subsequently, A P 1902 may be configured to receive a reject message indicating a reason for failure to connect to the higher precedence network slice. In an embodiment, the reason for failure may be based on one of an operator determined barring, insufficient resources, missing or unknown DNN, user authentication or authorization failed, service option not supported, requested service option not subscribed, out of LADN service area, insufficient resources for specific slice and DNN, not supported SSC mode, insufficient resources for specific slice, and missing or unknown DNN in a network slice.

Moving forward, the AP 1902 may be configured to determine an alternate to continue the data session on higher precedence Network Slice. Continuing with the above embodiment, Subsequently, A P 1902 may be configured to perform at least one of sending a request for a plurality of new URSP rules and resending a request for the data session after a time period indicated in the reject message.

Moving forward, the AP 1902 may be configured to send an evaluation request to the modem 1910, to re-evaluate the plurality of new URSP rules and initiating a PDU session request with the S-NSSAI in a rejected list with a corresponding back off timer expiry.

Continuing with the above embodiment, AP 1902 may be configured to register the UE on a new PLMN based on the reject message. In an embodiment, the reject message may determine that the one or more services is not available on a current PLMN. In an example embodiment, the UE may try to establish the PDU session for a network slice, or the UE may try to establish a session with one of the one or more TDs, and the one or more RSDs with a minimum precedence value unavailable due to S-NSSAI being absent from an allowed list. In an embodiment, the new PLMN may be manually selected by fetching by the AP 1902 an allowed S-NSSAI associated with at least one PLMN and the list of URSP rules from a web API with a UE ID and a location associated with the UE. In an embodiment, the PLMN may be selected manually by fetching by the AP 1902, the allowed S-NSSAI associated with at least one PLMN and the list of URSP rules through a one of a SoR container transport, a NAS transport procedure and a UCU procedure of a HPLMN.

Furthermore, the PLMN may be selected manually by fetching by the AP 1902 the allowed S-NSSAI associated with at least one PLMN and the list of URSP rules by temporarily registering on each scanned VPLMN providing an allowed S-NSSAI with a mapped HPLMN S-NSSAI utilized to check the URSP rules for the session establishment. In an embodiment, the PLMN may be selected automatically when the UE is in a roaming area. In an embodiment, in the roaming area, fetching the S-NSSAI associated with the at least one configured network slice and the at least one allowed network slice may be based on determining by the AP 1902 a probability of utilizing the one or more services in the UE by a user through a ML module. In an embodiment, the probability may be based on a previous history of utilizing one or more services by the user. In an embodiment, determining the probability of utilizing the one or more services in the UE by the user through the ML module may be based on monitoring over a period of time, a historical utilization the one or more services by the user. In an embodiment, the AP 1902 may further be configured to determine, the probability of utilizing the one or more services by the user after the said period of time. upon monitoring the historical utilization.

Moving forward, AP 1902 may be configured to update a database in the UE. In an embodiment, the database may include mapped S-NSSAI and a URSP table. In an embodiment, the updating may be performed with the web API when the allowed S-NSSAI associated with at least one PLMN and the list of URSP rules is fetched from the web API. In an embodiment, the updating may be performed with one of the SoR container transport, the NAS transport procedure and the UCU procedure when the allowed S-NSSAI associated with at least one PLMN and the list of URSP rules is fetched through a one of the SoR container transport, the NAS transport procedure and the UCU procedure of the HPLMN. Moving forward, the updating may be performed upon temporarily registering on each scanned VPLMN when the Allowed S-NSSAI associated with at least one PLMN and the list of URSP rules is fetched by temporarily registering on each scanned VPLMN.

Continuing with the above embodiment, AP 1902 may be configured to display one or more icons for the one or more services associated with the Allowed S-NSSAIs. In an embodiment, the one or more icons may be displayed within a DDS selection menu on a UI of the UE.

While specific language has been used to describe the present disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method for network slice enhancement for a user equipment (UE), the method comprising:
   receiving, at an application processor (AP) from a modem:
   a list of UE route selection policy (URSP) rules,
   one or more network slice selection assistance information (S-NSSAI) associated with one or more network slices categorized among configured network slices, rejected network slices, requested network slices, and allowed network slices, and
   protocol data unit (PDU) session information; and
   maintaining, by the AP, a database to store information received at the AP,
   wherein the one or more network slices execute one or more services at the UE.

2. The method of claim 1, further comprising performing a network slice management for the UE by:
   initiating, by the AP, a data session for at least one service of the one or more services on a higher precedence network slice;
   receiving, by the AP, a reject message indicating a reason for failure to connect to the higher precedence network slice;
   determining, by the AP, an alternate to continue the data session on a higher precedence network slice;
   performing, by the AP, at least one of:
   sending a request for a plurality of attributes in one or more route selector descriptors (RSDs) of the URSP rules; and
   sending a request for the data session after a time period indicated in the reject message;
   sending by the AP, an evaluation request to the modem, to re-evaluate a plurality of new URSP rules; and
   registering the UE on a new public land mobile network (PLMN) based on the reject message.

3. The method of claim 2, further comprising manually selecting the PLMN by:
   fetching, by an application programming interface (API), allowed S-NSSAI associated with at least one PLMN and a list of URSP rules through one of a steering of roaming (SoR) container transport, non-access stratum (NAS) transport procedure or a UE configuration update (UCU) procedure of a home PLMN (HPLMN);
   updating, by the AP, the database in the UE, with the allowed S-NSSAI associated with the at least one PLMN and the list of URSP rules received through the one of the SoR container transport, NAS transport procedure and the UCU procedure, wherein the database comprises mapped S-NSSAI and a URSP table, and
   displaying, by the AP, icons for services associated with the allowed S-NSSAIs.

4. The method of claim 2, further comprising manually selecting the PLMN by:
   fetching, by an application programming interface (API), allowed S-NSSAI associated with at least one PLMN and the list of URSP rules by temporarily registering the UE on each scanned virtual PLMN (VPLMN);
   updating, by the AP, the database in the UE, in response to temporarily registering the UE on each scanned VPLMN, wherein the database comprises mapped S-NSSAI and a URSP table; and
   displaying, by the AP, icons for services associated with the allowed S-NSSAIs.

5. The method of claim 2, further comprising manually selecting the PLMN by:
fetching, by an application programming interface (API), allowed S-NSSAI associated with at least one PLMN and the list of URSP rules from a web API with a UE identifier (ID) and a location associated with the UE;
updating, by the AP, the database in the UE, with the web API, wherein the database comprises mapped S-NSSAI and a URSP table; and
displaying, by the AP, icons for services associated with the allowed S-NSSAIs.

6. The method of claim 1, further comprising, when the UE is located in a roaming area, fetching the S-NSSAI associated with a configured network slices and the allowed network slices by determining, by the AP, a probability of utilizing the one or more services in the UE by a user through a machine learning (ML) module,
wherein the probability is based on a previous history of utilizing the one or more services by the UE.

7. The method of claim 6, wherein determining, by the AP, the probability of utilizing the one or more services in the UE by the user through the ML module comprises:
monitoring, over a period of time, a historical utilization of the one or more services by the UE; and
determining the probability of utilizing the one or more services by the UE after the period of time ends.

8. The method of claim 1, further comprising receiving information, by the AP, through generating an application programming interface (API) within the AP,
wherein the API is configured to:
fetch, the S-NSSAI associated with at least one configured network slice and at least one allowed network slice amongst the one or more network slices;
discard, a rule from the list of URSP rules upon determining an absence of S-NSSAI associated in a route selection descriptor (RSD) with at least one configured network slice or at least one allowed network slice;
determine, the one or more services in the UE with an available active network slice description with priorities at a current time and a location by accessing the database associated with the one or more services; and
trigger the AP for displaying one or more icons associated with the one or more services with a service descriptive text at the API of the UE.

9. The method of claim 8, further comprising displaying at least one icon by:
displaying, by the AP, an icon associated with the one or more services on the UE, within a dedicated data subscription (DDS) selection menu on a user interface (UI) of the UE,
wherein the icon associated with the one or more services corresponds to at least one subscriber identity module (SIM).

10. The method of claim 8, wherein icons are displayed in an order based on at least one of the one or more services associated with URSP rules in order of URSP rules precedence, most used services amongst the one or more services, and most recently used services.

11. The method of claim 8, wherein the generated API is further configured to inform one or more services within the UE about a plurality of events comprising a PDU session establishment accept, a PDU session modification, a PDU session release, a PDU session reject procedure and one or more network access stratum (NAS) mobility and session management related procedures.

12. The method of claim 8, wherein the generated API is further configured to update the one or more services with data related parameters comprising one or more of a reject cause, a session and service continuity (SSC) mode, a PDU session type, quality of service (QoS) rules, a session aggregate maximum bit rate (AMBR), a $5^{th}$ generation system (5GS) network feature support, network slice information, a 5GS mobile (5GSM) capability and a multi access support.

13. A system for network slice enhancement for a user equipment (UE), the system comprising:
a memory storing instructions; and
a processor configured to execute the instructions to:
receive, at an application processor (AP) from a modem:
a list of UE route selection policy (URSP) rules,
one or more network slice selection assistance information (S-NSSAI) associated with one or more network slices categorized among configured network slices, rejected network slices, requested network slices, and allowed network slices, and
protocol data unit (PDU) session information; and
maintain, by the AP, a database to store information received at the AP,
wherein the one or more network slices execute one or more services at the UE.

14. The system of claim 13, wherein the processor is further configured to execute the instructions to perform a network slice management for the UE by:
initiating, by the AP, a data session for at least one service of the one or more services on a higher precedence network slice;
receiving, by the AP, a reject message indicating a reason for failure to connect to the higher precedence network slice;
determining, by the AP, an alternate to continue the data session on a higher precedence network slice;
performing, by the AP, at least one of:
sending a request for a plurality of attributes in one or more route selector descriptors (RSDs) of the URSP rules; and
sending a request for the data session after a time period indicated in the reject message;
sending by the AP, an evaluation request to the modem, to re-evaluate a plurality of new URSP rules; and
registering the UE on a new public land mobile network (PLMN) based on the reject message.

15. The system of claim 14, wherein the processor is further configured to execute the instructions to manually select the PLMN by:
fetching, by an application programming interface (API), allowed S-NSSAI associated with at least one PLMN and a list of URSP rules through one of a steering of roaming (SoR) container transport, non-access stratum (NAS) transport procedure or a UE configuration update (UCU) procedure of a home PLMN (HPLMN);
updating, by the AP, the database in the UE, with the allowed S-NSSAI associated with the at least one PLMN and the list of URSP rules received through the one of the SoR container transport, NAS transport procedure and the UCU procedure, wherein the database comprises mapped S-NSSAI and a URSP table, and
displaying, by the AP, icons for services associated with the allowed S-NSSAIs.

16. The system of claim 14, wherein the processor is further configured to execute the instructions to manually select the PLMN by:
fetching, by an application programming interface (API), allowed S-NSSAI associated with at least one PLMN and the list of URSP rules by temporarily registering the UE on each scanned virtual PLMN (VPLMN);
updating, by the AP, the database in the UE, in response to temporarily registering the UE on each scanned VPLMN, wherein the database comprises mapped S-NSSAI and a URSP table; and
displaying, by the AP, icons for services associated with the allowed S-NSSAIs.

17. The system of claim 14, wherein the processor is further configured to execute the instructions to manually select the PLMN by:
fetching, by an application programming interface (API), allowed S-NSSAI associated with at least one PLMN and the list of URSP rules from a web API with a UE identifier (ID) and a location associated with the UE;
updating, by the AP, the database in the UE, with the web API, wherein the database comprises mapped S-NSSAI and a URSP table; and
displaying, by the AP, icons for services associated with the allowed S-NSSAIs.

18. The system of claim 13, wherein the processor is further configured to execute the instructions to, when the UE is located in a roaming area, fetching the S-NSSAI associated with the configured network slices and the allowed network slices by:
determining, by the AP, a probability of utilizing the one or more services in the UE by a user through a machine learning (ML) module,
wherein the probability is based on a previous history of utilizing the one or more services by the UE.

19. The system of claim 18, wherein determining, by the AP, the probability of utilizing the one or more services in the UE by the user through the ML module comprises:
monitoring over a period of time, a historical utilization of the one or more services by the UE; and
determining, the probability of utilizing the one or more services by the UE after the period of time ends.

20. The system of claim 13, wherein the processor is further configured to execute the instructions to receive the information by the AP through generating an API within the AP,
wherein the API is configured to:
fetching, the S-NSSAI associated with at least one configured network slice and at least one allowed network slice amongst the one or more network slices;
fetch, the S-NSSAI associated with at least one configured network slice and at least one allowed network slice amongst the one or more network slices;
discard, a rule from the list of URSP rules upon determining an absence of S-NSSAI associated in a route selection descriptor (RSD) with at least one configured network slice or at least one allowed network slice;
determine, the one or more services in the UE with an available active network slice description with priorities at a current time and a location by accessing the database associated with the one or more services; and
trigger the AP for displaying one or more icons associated with the one or more services with a service descriptive text at the API of the UE.

\* \* \* \* \*